United States Patent
Tidrow et al.

(10) Patent No.: US 7,087,186 B1
(45) Date of Patent: *Aug. 8, 2006

(54) FERROELECTRIC/PARAELECTRIC MATERIALS, AND PHASE SHIFTER DEVICES, TRUE TIME DELAY DEVICES AND THE LIKE CONTAINING SAME

(75) Inventors: Steven C. Tidrow, Silver Spring, MD (US); Daniel M. Potrepka, Silver Spring, MD (US); Arthur Tauber, Elberon, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/301,876

(22) Filed: Nov. 26, 2002

Related U.S. Application Data

(60) Provisional application No. 60/332,540, filed on Nov. 26, 2001, provisional application No. 60/332,535, filed on Nov. 26, 2001.

(51) Int. Cl.
*C04B 35/462* (2006.01)
*C04B 35/465* (2006.01)
*C04B 35/468* (2006.01)
*C04B 35/47* (2006.01)
*C04B 35/472* (2006.01)
*C04B 35/499* (2006.01)
*C04B 35/495* (2006.01)

(52) U.S. Cl. .................. 252/62.9 R; 252/62.9 PZ; 501/134; 501/135; 501/136; 501/138; 501/139; 501/152

(58) Field of Classification Search ............ 501/152, 501/134, 135, 136, 137, 138, 139; 252/62.9 R, 252/62.9 PZ
See application file for complete search history.

(56) References Cited

U.S. PATENT DOCUMENTS 3,463,732 A * 8/1969 Banno et al. ......... 252/62.9 PZ (Continued)

*Primary Examiner*—C. Melissa Koslow
(74) *Attorney, Agent, or Firm*—William V. Adams

(57) ABSTRACT

Single-phase, non-cubic and single-phase, cubic ferroelectric/paraelectric perovskite-structured materials having reasonably low and fairly temperature insensitive dielectric constants (stable dielectric constants over a wide range of operating temperatures of −80° C. to 100° C.), reasonable loss tangents ($<\sim 10^{-1}$), high tunability, and significantly lowered Curie temperature below the temperature range of operation for previous undoped perovskite structures are provided. The FE/PE materials of the present invention have dilute charge-compensated substitutions in the Ti site of the perovskite structure. This single-phase structure or a variant of it with a Ti rich composition, provided herein, allows for pulsed-laser-deposition of a thin film with uniform transfer of the structure of the target into the deposited film, which enables production of very small, lightweight devices that are extremely efficient and consume little power. These ferroelectric/paraelectric materials may be used in phase shifter devices (such as used in cell phones, antennas and the like), variable true time delay devices, steerable beams, tunable filters, impedance transformers, variable control oscillators, antennas, radios, filters, microwave variable capacitors, radar systems, electronic warfare sensors, resonators, microwave transverse-electromagnetic-ferroelectric voltage-controlled oscillators, and other RF, microwave, or millimeter wave tunable devices for synthesizers and systems incorporating all of the above, as well as any application that enhances the performance of various types of electrical and electro-optic devices.

66 Claims, 28 Drawing Sheets

U.S. PATENT DOCUMENTS

| | | | |
|---|---|---|---|
| 3,472,777 A | * 10/1969 | Brixner | 252/62.9 R |
| 3,472,779 A | * 10/1969 | Kurihara et al. | 252/62.9 PZ |
| 3,630,908 A | * 12/1971 | Osada et al. | 252/62.9 PZ |
| 3,663,440 A | * 5/1972 | Thomann | 252/62.9 PZ |
| 4,063,341 A | * 12/1977 | Bouchard et al. | 29/25.42 |
| 4,313,839 A | * 2/1982 | Fesenko et al. | 252/62.9 PZ |
| 6,599,854 B1 | * 7/2003 | Fujinaga et al. | 501/136 |
| 6,641,940 B1 | * 11/2003 | Li et al. | 428/702 |
| 6,645,395 B1 | * 11/2003 | Shindo et al. | 252/62.9 R |

* cited by examiner

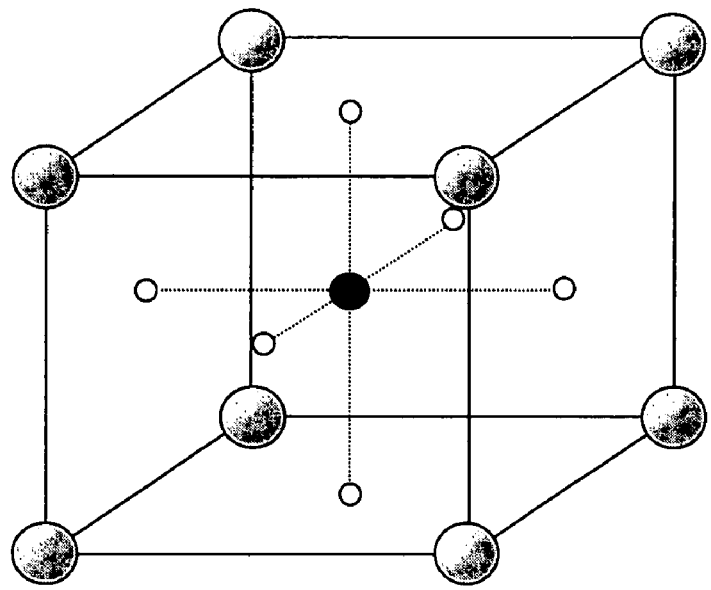
 A Site
 Oxygen Site
 B Site
Fig. 1

TABLE I.

| Ba$_x$ | Wt% Oxide | % Tunability | ε | | Tan(δ) | | ε$_{eff}$ | | Impedance | | Conductor Loss (dB/cm) | Dielectric Loss (dB/cm) | Total Loss (dB/cm) | 360° Phase Shift Length (cm) | Total Loss (dB) |
|---|---|---|---|---|---|---|---|---|---|---|---|---|---|---|---|
| 0.6 | 0 | 56.3 | 1002 | 438 | 0.0908 | | 629 | 276 | 5.04 | 7.83 | 2.09 | 21.11 | 23.20 | 0.35 | 8.1 |
| 0.6 | 60 | 10.0 | 118 | 106 | 0.0129 | | 74 | 67 | 14.7 | 15.5 | 0.72 | 1.03 | 1.75 | 7.19 | 12.6 |

Parameters for the simulated 10 GHz phase shifter using a microstrip design with a 3-mil-thick BST/MgO composite material (Wt% oxide = 60) compared to BST (Wt% Oxide = 0), and a 3-mil-wide 1 oz. copper line and a bias condition of 2 V/μm. Presented and published prior to Nov 30, 2000: S.C. Tidrow et al., Integrated Ferroelectrics Vol 28, p. 151 (2000).

Fig. 4

$Ba_{1-x}Sr_x(Z_yZ_{y'}')Ti_{1-2y+\delta}O_3$ with $x = 0.4$, $\delta = 0$, $y = 0.015$, and $Z = Z' = X$.

$Ba_{1-x}Sr_x(Z_yZ_y')Ti_{1-2y+\delta}O_3$ with $x = 0.4$, $\delta = 0$, $y = 0.03$, $Z = X$, and $Z' = V$.

$Ba_{1-x}Sr_x(Z_yZ_{y'}')Ti_{1-2y+\delta}O_3$ with $x = 0.4$, $\delta = 0$, $y = 0.03$, $Z = X$, and $Z' = Sb$.

Ba$_{1-x}$Sr$_x$(Z$_y$Z$_y$')Ti$_{1-2y+\delta}$O$_3$ with $x = 0.4$, $\delta = 0$, $y = 0.03$, $Z = X$, and $Z' = $ Ta.

$Ba_{1-x}Sr_x(Z_yZ_y')Ti_{1-2y+\delta}O_3$ with $x = 0.4$, $\delta = 0$, $y = 0.05$, $Z = X$, and $Z' = Ta$.

Table II.

| Samples Synthesized with $x = 0.4$ Sr Content |
|---|
| BST64 Control Sample, 3 and 6 % Substitution for Ti: |
| $Ba_{0.6}Sr_{0.4}TiO_3$ (BST64)         $Ba_{0.6}Sr_{0.4}Al_{0.03}Sb_{0.03}Ti_{0.94}O_3$ <br> $Ba_{0.6}Sr_{0.4}Ge_{0.03}Ti_{0.97}O_3$         $Ba_{0.6}Sr_{0.4}In_{0.03}Sb_{0.03}Ti_{0.94}O_3$ <br> $Ba_{0.6}Sr_{0.4}Sn_{0.03}Ti_{0.97}O_3$         $Ba_{0.6}Sr_{0.4}Sc_{0.03}Sb_{0.03}Ti_{0.94}O_3$ <br> $Ba_{0.6}Sr_{0.4}Zr_{0.03}Ti_{0.97}O_3$         $Ba_{0.6}Sr_{0.4}Y_{0.03}Sb_{0.03}Ti_{0.94}O_3$ <br><br> $Ba_{0.6}Sr_{0.4}Al_{0.03}V_{0.03}Ti_{0.94}O_3$         $Ba_{0.6}Sr_{0.4}Al_{0.03}Ta_{0.03}Ti_{0.94}O_3$ <br> $Ba_{0.6}Sr_{0.4}Ga_{0.03}V_{0.03}Ti_{0.94}O_3$         $Ba_{0.6}Sr_{0.4}Ga_{0.03}Ta_{0.03}Ti_{0.94}O_3$ <br> $Ba_{0.6}Sr_{0.4}In_{0.03}V_{0.03}Ti_{0.94}O_3$         $Ba_{0.6}Sr_{0.4}In_{0.03}Ta_{0.03}Ti_{0.94}O_3$ <br> $Ba_{0.6}Sr_{0.4}Sb_{0.03}V_{0.03}Ti_{0.94}O_3$         $Ba_{0.6}Sr_{0.4}Y_{0.03}Ta_{0.03}Ti_{0.94}O_3$ <br> $Ba_{0.6}Sr_{0.4}Sc_{0.03}V_{0.03}Ti_{0.94}O_3$ <br> $Ba_{0.6}Sr_{0.4}Y_{0.03}V_{0.03}Ti_{0.94}O_3$ |
| 10 % Substitution for Ti: |
| $Ba_{0.6}Sr_{0.4}Sc_{0.05}Ta_{0.05}Ti_{0.90}O_3$ <br> $Ba_{0.6}Sr_{0.4}Y_{0.05}Ta_{0.05}Ti_{0.90}O_3$ |

Fig. 12

Fig. 14(a)
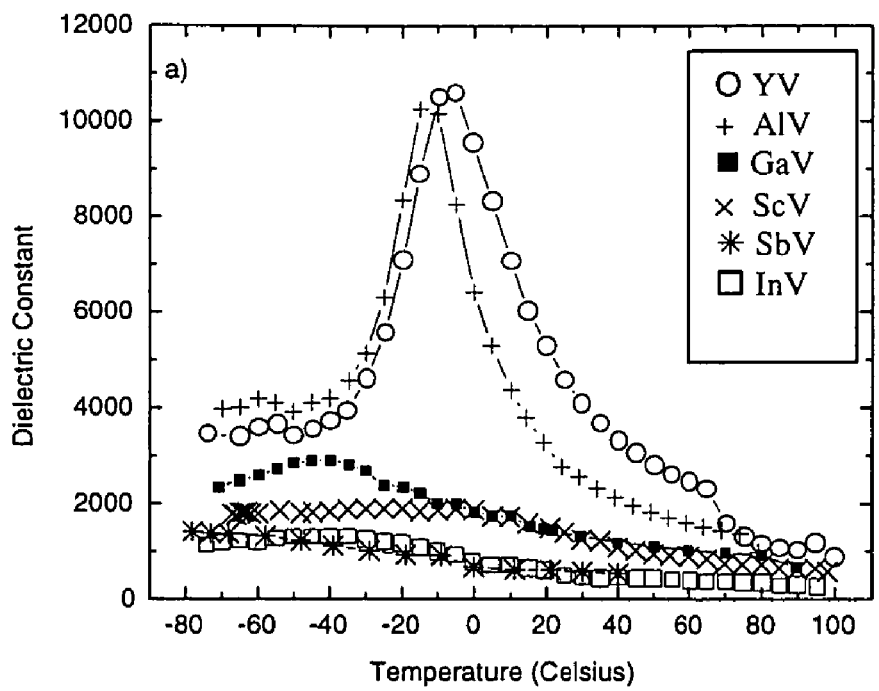
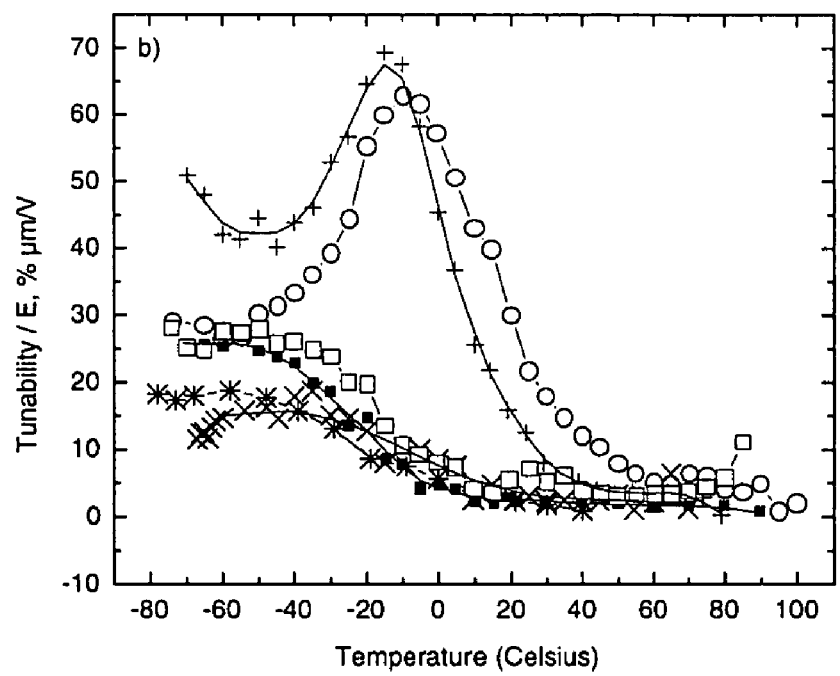
Fig. 14(b)

Fig. 16(a)
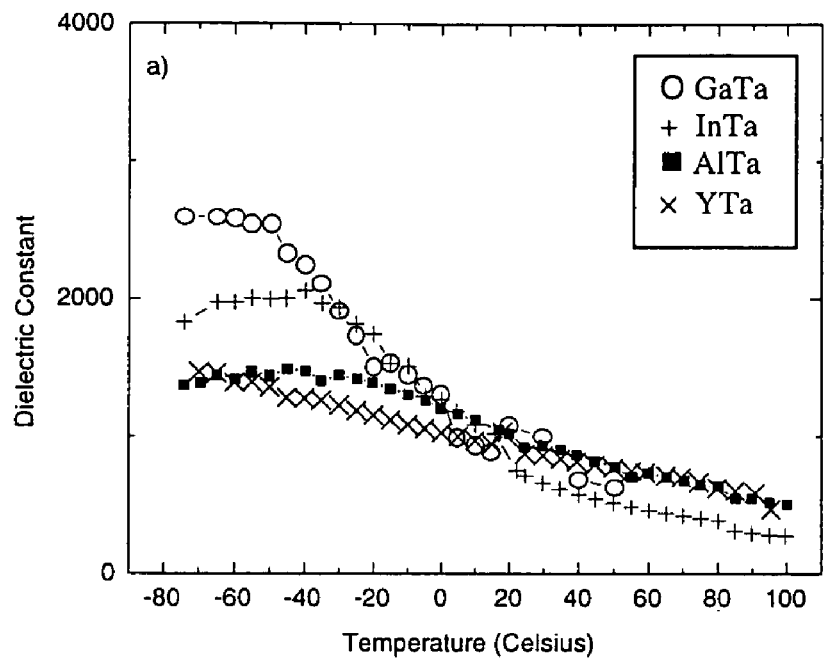
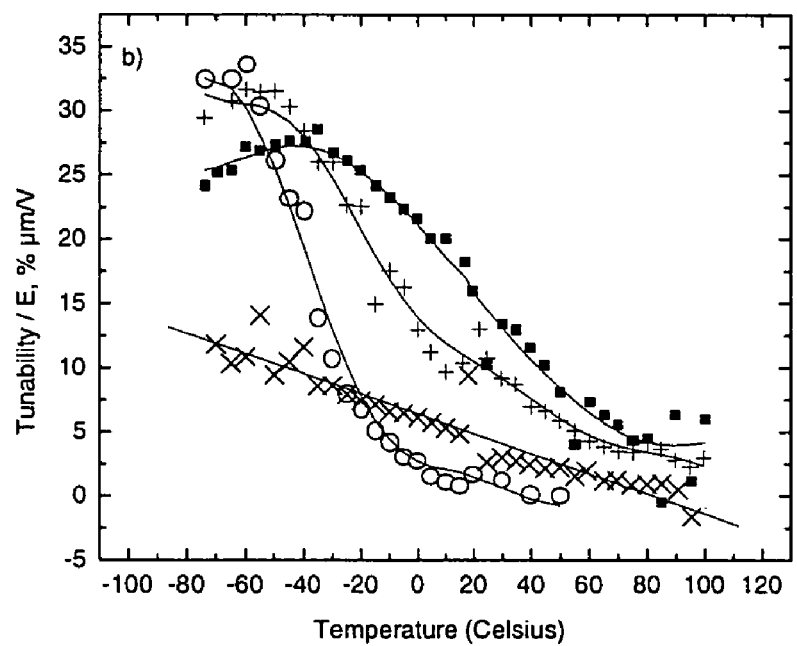
Fig. 16(b)

TABLE III.

| | $\varepsilon$ | $\dfrac{\%\text{Tun}}{E}\left[\%\cdot\dfrac{\mu m}{V}\right]$ | $T_{min}, T_{max}$ (°C) | $T_c^{E=0}$ (°C) |
|---|---|---|---|---|
| Dielectric Constant, Tunability, Temperature Ranges and Critical Temperature | | | | |
| Reference Samples | | | | |
| BST64 | 2200-800 | 41-0 | −20, 60 | 5 |
| BSTMgO | 200-100 | 9-1 | −75, 100 | −30 |
| 3 % Substitution of 4+ Valence Ions for Ti in BST64 | | | | |
| Ge | 1100-200 | 39-0 | −75, 85 | −5 |
| Sn | 1600-500 | 41-0 | −40, 50 | −10 |
| Zr | 2000-700 | 47-0 | −30, 80 | 2 |
| 3 and 5 % Substitution of (3+, 5+) Pairs for Ti at % Indicated | | | | |
| AlV (6%) | 10500-1000 | 70-2 | −75, 100 | −12 |
| GaV (6%) | 2800-500 | 25-0 | −75, 100 | −40 |
| InV (6%) | 1350-200 | 28-5 | −75, 95 | −45 |
| SbV (6%) | 1400-500 | 19-0 | −75, 40 | < −75 |
| ScV (6%) | 1800-500 | 17-2 | −75, 100 | ≤ −10 |
| YV (6%) | 11000-0 | 65-0 | −75, 100 | −10 |
| AlSb (6%) | 2000-600 | 20-0 | −75, 100 | < −75 |
| InSb (6%) | 2000-200 | 35-0 | −75, 100 | −60 |
| ScSb (6%) | 3250-500 | 20-0 | −60, 100 | −45 |
| YSb (6%) | 2400-700 | 17-0 | −75, 100 | ≲ −60 |
| AlTa (6%) | 1500-450 | 12.5-0 | −75, 100 | < −75 |
| GaTa (6%) | 2600-600 | 33-0 | −75, 100 | < −75 |
| InTa (6%) | 2000-250 | 32-2 | −75, 100 | −40 |
| YTa (6%) | 1500-500 | 28-3 | −75, 100 | < −75 |
| ScTa (10%) | 1700-300 | 31-8 | −75, 95 | < −75 |
| YTa (10%) | 850-350 | 14-2 | −75, 100 | < −75 |

BST64 = $Ba_{0.6}Sr_{0.4}TiO_3$
BSTMgO = 40 Wt% BST64 + 60 Wt% MgO

Fig. 24

TABLE IV.

Tunability Results for Sr/Ba Ratio 0, 1/9, 2/8

| Composition | $\varepsilon$ | $\frac{\%Tun}{E}\left[\frac{\mu m}{V}\right]$ | $T_{min}, T_{max}$ (°C) | $T_C^{E=0}$(°C) | |
|---|---|---|---|---|---|
| $BaMg_{0.05}Mo_{0.05}Ti_{0.9}O_3$ | 1680-500 | 10-5 | -75, 100 | <-75 | |
| $Ba_{0.9}Sr_{0.1}Sc_{0.05}Ta_{0.05}Ti_{0.99}O_{3+y}$ | 450-400 | 9-6 | -75, 100 | <-75 | SCTAT000627 |
| $Ba_{0.9}Sr_{0.1}Sc_{0.05}Ta_{0.05}Ti_{0.9}O_3$ | 1125-625 | 23-12 | -75, 100 | <-75 | DP000807 |
| $Ba_{0.9}Sr_{0.1}Al_{0.05}Ta_{0.05}Ti_{0.9}O_3$ | 300-230 | 2.3-1.7 | 20, 100 | <20 | SCTAT051600G |
| $Ba_{0.9}Sr_{0.1}Al_{0.05}Ta_{0.05}Ti_{0.9}O_3$ | 600-500 | 7-5 | -50, 100 | <-50 | SCTAT82 |
| $Ba_{0.9}Sr_{0.1}Al_{0.05}Ta_{0.05}Ti_{0.9}O_3$ | 1800-1200 | 11 | -73, 23 | <-75 | SCTAT051100C |
| $95\%Ba_{0.9}Sr_{0.1}Sc_{0.05}Ta_{0.05}Ti_{0.9}O_3{}^\dagger$ | 720-550 | ~2 | 15, 95 | <15 | |
| $85\%Ba_{0.9}Sr_{0.1}Sc_{0.05}Ta_{0.05}Ti_{0.9}O_3{}^\dagger$ | 610-475 | ~2 | 15, 100 | <15 | |
| $Ba_{0.95}Sr_{0.05}Al_{0.10}Ta_{0.10}Ti_{0.80}O_3$ | 625-300 | ~2 | -75, 100 | <-75 | |
| $Ba_{0.9}Sr_{0.1}In_{0.1}Sb_{0.1}Ti_{0.8}O_3$ | 725-350 | 7-2 | -75, 100 | <-75 | |
| $Ba_{0.9}Sr_{0.1}Zn_{0.05}W_{0.05}Ti_{0.9}O_3$ | 1500-700 | 33-6 | -75, 90 | <-35 | |
| $Ba_{0.8}Sr_{0.2}In_{0.05}Ta_{0.05}Ti_{0.9}O_3$ | 1150-400 | 16-1 | -75, 100 | -25 | |
| $Ba_{0.9}Sr_{0.1}Al_{0.075}Ta_{0.075}Ti_{0.85}O_3$ | 1100-600 | 3.5-1.7 | -75, 100 | <-75 | |
| $Ba_{0.8}Sr_{0.2}Ga_{0.05}Ta_{0.05}Ti_{0.9}O_3$ | 1800-500 | 18-1.5 | -75, 100 | <-50 | |
| $Ba_{0.8}Sr_{0.2}Y_{0.05}Ta_{0.05}Ti_{0.9}O_3$ | 1250-700 | 18-5 | -75, 100 | -33 | |
| $Ba_{0.9}Sr_{0.1}Lu_{0.1}Ta_{0.1}Ti_{0.8}O_3$ | 1500-600 | 17-2 | -50, 100 | <-50 | |
| $Ba_{0.9}Sr_{0.1}Y_{0.05}Ta_{0.05}Ti_{0.9}O_3$ | 1500-900 | 23-10 | -75, 100 | -8 | |
| $Ba_{0.8}Sr_{0.2}Al_{0.1}Ta_{0.1}Ti_{0.8}O_3$ | 4750-625 | 52-1.5 | -75, 100 | -50 | |
| $Ba_{0.9}Sr_{0.1}Lu_{0.05}Ta_{0.05}Ti_{0.9}O_3$ | 2800-1200 | 39-7 | -75, 100 | 6 | |
| $Ba_{0.9}Sr_{0.1}In_{0.05}Sb_{0.05}Ti_{0.9}O_3$ | 8500-1000 | 64-6 | -50, 100 | <-50 | |
| $Ba_{0.9}Sr_{0.1}Al_{0.025}Ta_{0.025}Ti_{0.95}O_3$ | 4400-1800 | 28-3.3 | -75, 100 | -10 | |

†Balance MgO

Tunability Results for Sr/Ba ratio 4/6

| Composition | $\varepsilon$ | $\frac{\%Tun}{E}\left[\frac{\mu m}{V}\right]$ | $T_{min}, T_{max}$ (°C) | $T_C^{E=0}$(°C) | |
|---|---|---|---|---|---|
| $Ba_{0.6}Sr_{0.4}TiO_3$ | 2200-800 | 41-0 | -20, 60 | 5 | |
| $Ba_{0.6}Sr_{0.4}TiO_3 + 60Wt\%MgO$ | 200-100 | 9-1 | -75, 100 | ~-30 | (Sengupta Sample) |
| $Ba_{0.6}Sr_{0.4}Ge_{0.03}Ti_{0.97}O_3$ | 1100-200 | 39-0 | -75, 85 | -5 | |
| $Ba_{0.6}Sr_{0.4}Sn_{0.03}Ti_{0.97}O_3$ | 1600-500 | 41-0 | -40, 50 | -10 | |
| $Ba_{0.6}Sr_{0.4}Zr_{0.03}Ti_{0.97}O_3$ | 2000-700 | 47-0 | -30, 80 | 2 | |
| $Ba_{0.6}Sr_{0.4}Y_{0.05}Ta_{0.05}Ti_{0.90}O_3$ | 850-350 | 14-2 | -75, 100 | <-75 | |
| $Ba_{0.6}Sr_{0.4}In_{0.03}V_{0.03}Ti_{0.94}O_3$ | 1350-200 | 28-5 | -75, 95 | -45 | |
| $Ba_{0.6}Sr_{0.4}Sb_{0.03}V_{0.03}Ti_{0.94}O_3$ | 1400-500 | 19-0 | -75, 40 | <-75 | |
| $Ba_{0.6}Sr_{0.4}Al_{0.03}Ta_{0.03}Ti_{0.94}O_3$ | 1500-450 | 12.5-0 | -75, 100 | <-75 | |
| $Ba_{0.6}Sr_{0.4}Y_{0.03}Ta_{0.03}Ti_{0.94}O_3$ | 1500-500 | 28-3 | -75, 100 | <-75 | |
| $Ba_{0.6}Sr_{0.4}Sc_{0.05}Ta_{0.05}Ti_{0.90}O_3$ | 1700-300 | 31-8 | -75, 95 | <-75 | |
| $Ba_{0.6}Sr_{0.4}Sc_{0.03}V_{0.03}Ti_{0.94}O_3$ | 1800-500 | 17-2 | -75, 100 | ≤-10 | |
| $Ba_{0.6}Sr_{0.4}In_{0.03}Ta_{0.03}Ti_{0.94}O_3$ | 2000-250 | 32-2 | -75, 100 | -40 | |
| $Ba_{0.6}Sr_{0.4}In_{0.03}Sb_{0.03}Ti_{0.94}O_3$ | 2000-200 | 35-0 | -75, 100 | -60 | |
| $Ba_{0.6}Sr_{0.4}Al_{0.03}Sb_{0.03}Ti_{0.94}O_3$ | 2000-600 | 20-0 | -75, 100 | <-75 | |
| $Ba_{0.6}Sr_{0.4}Y_{0.03}Sb_{0.03}Ti_{0.94}O_3$ | 2400-700 | 17-0 | -75, 100 | <-60 | |
| $Ba_{0.6}Sr_{0.4}Ga_{0.03}Ta_{0.03}Ti_{0.94}O_3$ | 2600-600 | 33-0 | -75, 100 | <-75 | |
| $Ba_{0.6}Sr_{0.4}Ga_{0.03}V_{0.03}Ti_{0.94}O_3$ | 2800-500 | 25-0 | -75, 100 | -40 | |
| $Ba_{0.6}Sr_{0.4}Sc_{0.03}Sb_{0.03}Ti_{0.94}O_3$ | 3250-500 | 20-0 | -60, 100 | -45 | |
| $Ba_{0.6}Sr_{0.4}Al_{0.03}V_{0.03}Ti_{0.94}O_3$ | 10000-1000 | 70-2 | -75, 100 | -12 | |
| $Ba_{0.6}Sr_{0.4}Y_{0.03}V_{0.03}Ti_{0.94}O_3$ | 11000-0 | 65-0 | -75, 100 | -10 | |

Fig. 25

TABLE V.

Figure of Merit

$$FOM = \frac{\Delta\varepsilon}{\Delta E} \bigg/ \frac{\Delta\varepsilon}{\Delta T}, \left[°C \cdot \frac{\mu m}{V}\right]$$

| Temperature→ | $T_{min}^P$ | 20 °C | $T_{max}$ |
|---|---|---|---|
| Reference Samples | | | |
| BST64 | 32 | 12 | 0 |
| BSTMgO | 14.5 | 14.5 | 3 |
| 3 % Substitutions of 4+ Valence Ions for Ti in BST64 | | | |
| Ge | 27 | 5.3 | 0 |
| Sn | 31 | 4.9 | 0 |
| Zr | 41 | 18 | 2.6 |
| 3 and 5 % Substitution of (3+, 5+) Valence Ions for Ti at % Indicated | | | |
| AlV (6%) | 25 | 5.2 | 0 |
| GaV (6%) | 42 | 2.1 | 0 |
| InV (6%) | 48 | 1.8 | 0 |
| SbV (6%) | 29 | 1.4 | 0 |
| ScV (6%) | 67.5 | 2.1 | 0 |
| YV (6%) | 28 | 10.5 | 1 |
| AlSb (6%) | 34.5 | 2.6 | 0 |
| InSb (6%) | 59.5 | 1.7 | 0 |
| ScSb (6%) | 45.5 | 3.0 | 0 |
| Ysb (6%) | 24 | 8.5 | 0 |
| AlTa (6%) | 37 | 15.5 | 2 |
| GaTa (6%) | 41.5 | 0.8 | 0.4 |
| InTa (6%) | 53 | 6.4 | 2.3 |
| YTa (6%) | 31.5 | 10 | 1 |
| ScTa (10%) | 52.5 | 12.5 | 2.9 |
| YTa (10%) | 17.5 | 9.3 | 2.5 |

BST64 = $Ba_{0.6}Sr_{0.4}TiO_3$
BSTMgO = 40 Wt% BST64 + 60 Wt% MgO

Fig. 26

TABLE VI.

| | Loss Tangent and $\varepsilon$ at 20 °C | | |
|---|---|---|---|
| | tan$\delta$ (1 kHz) | $\varepsilon$(1 kHz) | $\varepsilon$(1 MHz) |
| Reference Measurements | | | |
| BST64 | 0.0065 | 2874 | 1750 |
| RT/Duroid | 0.0065 | 5 | 9 |
| Open | 0.0025 | | |
| 4+ Valence Substitutions for Ti in BST64 | | | |
| Ge (3%) | 0.0045 | 1474 | 750 |
| Zr (3%) | 0.0055 | 3691 | 1570 |
| Sn (3%) | 0.0075 | 1990 | 1040 |
| 3 and 5 % Substitution of (3+, 5+) Valence Ions for Ti at % Indicated | | | |
| AlV (6%) | 0.001 | 2689 | 2500 |
| GaV (6%) | 0.002 | 1145 | 1500 |
| InV (6%) | 0.005 | 761 | 500 |
| SbV (6%) | 0.004 | 867 | 500 |
| ScV (6%) | 0.004 | 1565 | 1500 |
| YV (6%) | 0.006 | 5270 | 4000 |
| AlSb (6%) | 0.0165 | 808 | 1000 |
| InSb (6%) | 0.0075 | 1172 | 1000 |
| ScSb (6%) | 0.03 | 1617 | 1000 |
| Ysb (6%) | 0.0065 | 1396 | 1000 |
| AlTa (6%) | 0.0035 | 514 | 1000 |
| GaTa (6%) | 0.005 | 948 | 1000 |
| InTa (6%) | 0.0205 | 821 | 1000 |
| YTa (6%) | 0.0055 | 1106 | 1000 |
| ScTa (10%) | 0.011 | 473 | 544 |
| YTa (10%) | 0.0075 | 701 | 544 |

BST64 = $Ba_{0.6}Sr_{0.4}TiO_3$
BSTMgO = 40 Wt% BST64 + 60 Wt% MgO

Fig. 27

FERROELECTRIC/PARAELECTRIC MATERIALS, AND PHASE SHIFTER DEVICES, TRUE TIME DELAY DEVICES AND THE LIKE CONTAINING SAME

BENEFIT CLAIM

This application claims the benefit of U.S. Provisional Application No. 60/332,540 filed Nov. 26, 2001, and U.S. Provisional Application No. 60/332,535 filed Nov. 26, 2001 each of which is incorporated by reference herein in its entirety.

STATEMENT OF GOVERNMENT INTEREST

The invention described herein may be manufactured, used and/or licensed by or for the United States Government without the payment of any royalties.

FIELD OF THE INVENTION

The present invention provides ferroelectric/paraelectric materials (FE/PE materials), which may be used in electric-field tunable devices, such as RF (radio-frequency), microwave and millimeter-wave tunable devices such as filters, phase shifter and true time delay applications, and filters, phase shifter and true time delay devices comprising the same. Specifically, the FE/PE materials provided are formed of the perovskite oxide $ABO_3$ structure by charge compensated atomic substitutions into the A-site or B-site or simultaneous substitutions into the A- and B-sites of the perovskite oxide $ABO_3$.

BACKGROUND OF THE INVENTION

Development of phase shifter and variable true time delay devices is of interest for beam steering of phased-array antennas at microwave frequencies. Phase shifter and variable true time delay technologies include, but are not limited to, those based on FE/PEs, laser diodes, MEMS, interferometry, pin diodes, and ferrites. The objects of these technologies are the reduction of cost, power consumption, weight, and size of devices, while maintaining or exceeding performance, frequency range and bandwidth of existing devices. Cost of device architecture and control circuitry, device bandwidth, material permittivity/permeability, loss factor, conductor losses, and impedance mismatch are all considerations that must be factored into the decision to choose materials and designs. However, all of the above technologies have disadvantages that must be overcome before affordable high performance broadband electronically scanned antenna systems may be realized.

In an effort to overcome the disadvantages of the above technologies, and to provide affordable high performance electronic beam steering of antennas at microwave frequencies, FE/PE materials derived from $Ba_{1-x}Sr_xTiO_3$ (BST) have been previously proposed and investigated. Such FE/PE phase shifters are based on the change in the effective electrical length of the device due to a change in the material permittivity induced by applying a dc electric field with field strength in the range 0.1 to 100 V/μm in the material. From a device design and operation point-of-view, physical parameters of interest are the real permittivity (hereinafter referred to as dielectric constant is $\epsilon$) of the material, tunability of the material, and microwave loss of the material as functions of both temperature and frequency. The ability to impedance match to the device is improved if the permittivity $\epsilon$) of materials used is relatively low; however, high $\in$ doesn't always dictate a decrease in phase shifter performance.

Large tunability is desirable for shortening the length of line needed to provide the identical phase shift for each fixed electric field strength in a phased-array antenna. Lower loss tangent materials can further reduce phase shifter losses in the RF, microwave and millimeter wave range if appropriate tunability can be maintained. Dielectric constant, tunability and loss tangent can all vary significantly with both frequency and temperature.

All three of the above parameters of a FE/PE material increase and peak as the Curie temperature, $T_c$, is approached. If the Curie transition is sharp, the material will have a limited temperature range for operation because the tunability rapidly approaches zero, as demonstrated in FIG. 2, for temperatures away from the Curie point. Below the Curie temperature, the FE/PE material again exhibits reduced tunability and losses can be unacceptably high. Thus, conventional FE/PE phase shifters are typically operated at $T>T_c$, where they are paraelectric (PE).

Therefore, it is an object of the present invention to provide a FE/PE material whose dielectric constant has a gradual peak, as shown in FIG. 2, at the Curie temperature, and is as low a dielectric constant as possible, in order to overcome the above deficiencies of previous FE/PE materials and to provide a more constant $\epsilon$, broader temperature range of operation and improved impedance match for the device. Other objects of the present invention include providing higher change in dielectric constant for a given change in magnitude of dc electric field applied to the material and, for some applications, higher rather than lower dielectric constant.

The effects of structure on the FE/PE transition have been previously analyzed for a variety of cation substitutions into $BaTiO_3$. It was found that covalency can influence lattice distortion, spontaneous polarization and $T_c$. In the previous work, $T_c$ was correlated with chemical bonds. The various parameters considered were size, charge, coordination number, electronic configuration of the cations, bond covalency, and cationic ordering. It has been suggested in those previous studies that $T_c$ may be a function of octahedral distortion; values might be adjustable with a minimal number of parameters compared to band structure analysis.

Several methods have been previously used for synthesizing FE/PE materials, such as producing perovskite oxide materials for use in microwave phase shifters. For example, composites comprising magnesia (MgO) and a solid solution of BST have been produced by making a simple weight percent addition of MgO to BST. However, temperature-dependent data of the low permittivity and tunability of the same indicate that such material may have limited use over the military specified temperature range of operation (−50° C. to 100° C.). In addition, two-phase composites may also complicate methods to effectively deposit thin films of the FE/PE material for devices, particularly if the MgO and perovskite are not compatible for simultaneous deposition or simultaneous adhesion with a substrate, or are not compatible with each other.

In addition to two-phase composites of MgO and perovskite, previous attempts have been made to dope perovskites with $Al_2O_3$ to increase tunability. Significant tunability increases have been observed. However, results were only obtained at room temperature using low doping on the order of 1% to obtain single-phase material, and it is believed that this material has a sharp Curie transition temperature and suffers from a limited temperature range of operation.

Compositions in which charge-compensated substitutions into the A and B site have been produced, referred to as acceptor-donor co-doped BaTiO$_3$, the focus of the producers thereof attempting to achieve high tunability and low dielectric loss tangents over a broad temperature range that includes the mil spec range. However, methods to achieve reduction of $\epsilon$ or constant $\epsilon$, and tunability versus temperature, were not investigated.

The effects upon $T_c$ of substitutions of Zr and of Sn for Ti in BaTiO$_3$ have been previously studied, and the development of new materials in which cation size and charge affect how $T_c$ is shifted have been considered, but tunability of such systems has not been previously analyzed. The effects of structure on the FE/PE transition have been analyzed for a variety of cation substitutions into BaTiO$_3$, and it was found that covalency can influence lattice distortion, spontaneous polarization and $T_c$. Further, $T_c$ was correlated with chemical bonds. The various parameters considered were size, charge, coordination number, electronic configuration of the cations, bond covalency, and cationic ordering, and it was suggested that $T_c$ may be a function of octahedral distortion; values might be adjustable with a minimal number of parameters compared to band structure analysis.

While FE/PEs afford many advantages for electrical beam steering of antennas, one major disadvantage of current FE/PE phase shifters is the temperature sensitivity of phase shifter devices due to the sensitivity of permittivity (dielectric constant) to temperature variation. In order to control temperature variation, temperature-compensation circuits, ovens, cooling systems and the like are currently needed. Thus, it is an object of the present inventors to provide a FE/PE material, for electric-field tunable devices such as phase shifter applications, having uniform permittivity and tunability throughout the temperature range of operation, i.e., a material that is relatively insensitive to temperature variation or equivalently having a small temperature coefficient of permittivity and tunablility over the desired range of operating temperatures. Such a FE/PE material would simplify electric control circuitry so that temperature-compensation circuits or ovens can be eliminated, thus reducing overall cost and size of devices.

SUMMARY OF THE INVENTION

In order to achieve the objects of the present invention as described above, the present inventors provide herewith a FE/PE material for electric-field tunable devices, with emphasis for RF tunable, microwave, and millimeter devices such as phase shifter and true time delay applications, having uniform permittivity and tunability throughout the temperature range of operation, i.e., a material that is relatively insensitive to temperature variation or equivalently having a small temperature coefficient of permittivity and tunablility over the desired range of operating temperatures. Such a FE/PE material simplifies electric control circuitry so that temperature-compensation circuits or ovens can be eliminated, thus reducing overall cost and size of devices, and enables production of both perovskite bulk and thin film FE/PE materials for use in a myriad of applications.

In a first embodiment of the present invention, a ferroelectric/paraelectric material is provided for use in tunable devices, having the following general formula I:

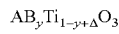

$$AB_yTi_{1-y+\Delta}O_3 \qquad I$$

wherein A is one or more divalent (2$^+$) ions selected from the group consisting of Ba, Sr, Ca, and Pb; B is one or more trivalent (3$^+$) ions selected from the group consisting of Al, Ga, In, Sc, Pr, Nd, Sm, Eu, Gd, Tb, Dy, Ho, Er, Tm, Yb, Y, and Lu, paired with one or more pentavalent (5$^+$) ions selected from the group consisting of Sb, Ta, Nb and V; or B is one or more divalent (2$^+$) ions selected from the group consisting of Zn, Mg, and Ca, paired with one or more hexavalent (6$^+$) ions selected from the group consisting of W, and Mo; or B is a combination of said 3$^+$ and 5$^+$ ions paired with said 2$^+$ and 6$^+$ ions such that charge compensation is maintained; 0<y<1, and 0$\leq\Delta\leq$0.2 and represents addition of excess titanium; and wherein said material is a pseudo ternary or higher system in the form of a single phase solid solution of a perovskite having a crystalline structure with charge balanced constituents.

In a second embodiment of the present invention, the ferroelectric/paraelectric material of the first embodiment is provided, wherein the perovskite structure has an A and B site in the cubic crystalline structure with the A site being 12 fold coordinated with oxygen atoms and the B site being 6 fold coordinated with oxygen atoms, and wherein:

the A site can further comprise at least one member selected from the group consisting of one or more monovalent (1$^+$) ions selected from the group consisting of Li, Na, K, Rb and Cs, paired with one or more trivalent (3$^+$) ions selected from the group consisting of La, Pr, Nd, Sm, Eu, Gd, Tb, Dy, Ho, Er, Tm, Yb, Lu and Y, and combinations thereof, such that charge compensation is maintained in the A site; and the B site can further comprise one or more members selected from the group consisting of one or more trivalent (3$^+$) ions selected from the group consisting of Al, Ga, In, Sc, Pr, Y, Nd, Sm, Eu, Gd, Tb, Dy, Ho, Er, Tm, Yb and Lu; paired with one or more pentavalent (5$^+$) ions selected from the group consisting of Sb, Ta, Nb, and V, and combinations thereof, such that charge compensation is maintained in the B-site.

In a third embodiment of the present invention, the ferroelectric/paraelectric material of the first embodiment is provided, wherein A can further comprise at least one member selected from the group consisting of one or more divalent (2$^+$) ions selected from the group consisting of Sr, Ba, Ca, and Pb; with one or more monovalent (1$^+$) ions selected from the group consisting of Li, Na, K, Rb, and Cs; paired with one or more trivalent (3$^+$) ions selected from the group consisting of La, Pr, Nd, Sm, Eu, Gd, Tb, Dy, Ho, Er, Tm, Yb, Y, and Lu; and B can further comprise one or more members selected from the group consisting of one or more divalent (2$^+$) ions selected from the group consisting of Zn, Mg, and Ca, paired with one or more hexavalent (6$^+$) ions selected from the group consisting of W, and Mo; or B can comprise one or more members selected from the group consisting of one or more trivalent (3$^+$) ions selected from the group consisting of Al, Ga, In, Sc, Pr, Y, Nd, Sm, Eu, Gd, Tb, Dy, Ho, Er, Tm, Yb and Lu; paired with one or more pentavalent (5$^+$) ions selected from the group consisting of Sb, Ta, Nb, and V, and combinations thereof, such that charge compensation is maintained.

In a fourth embodiment of the present invention, the ferroelectric/paraelectric material of the first embodiment is provided, wherein B can further comprise one or more members selected from the group consisting of Ge, one or more trivalent (3$^+$) ions selected from the group consisting of Al, Ga, In, Sc, Pr, Nd, Sm, Eu, Gd, Tb, Dy, Ho, Er, Tm, Yb, Y, and Lu, paired with one or more pentavalent (5$^+$) ions selected from the group consisting of Sb, Ta, Nb, and V; and one or more divalent (2$^+$) ions selected from the group consisting of Zn, Mg, and Ca, paired with one or more hexavalent (6+) ions selected from the group consisting of W, and Mo, such that charge compensation is maintained.

In a fifth embodiment of the present invention, the ferroelectric/paraelectric material of the first embodiment is provided, wherein B can further comprise at least one member selected from the group consisting of one or more tetravalent (4+) ions selected from the group consisting of Ge, Sn, and Zr, with one or more divalent (2+) ions selected from the group consisting of Zn, Mg, and Ca, paired with one or more hexavalent (6+) ions selected from the group consisting of W, and Mo, such that charge compensation is maintained.

In a sixth embodiment of the present invention, the ferroelectric/paraelectric material of the first embodiment is provided, wherein B can further comprise at least one member selected from the group consisting of one or more tetravalent (4+) ions selected from the group consisting of Ge, Sn, and Zr, with one or more combinations of trivalent (3+) ions selected from the group consisting of Al, Ga, In, Sc, Pr, Nd, Sm, Eu, Gd, Tb, Dy, Ho, Er, Tm, Yb, Y, and Lu, paired with one or more pentavalent (5+) ions selected from the group consisting of Sb, Ta, Nb, and V, such that charge compensation is maintained.

In a seventh embodiment of the present invention, the ferroelectric/paraelectric material of the first embodiment is provided, wherein B further comprises at least one member selected from the group consisting of one or more tetravalent (4+) ions selected from the group consisting of Ge, Sn, and Zr; with one or more trivalent (3+) ions selected from the group consisting of Al, Ga, In, Sc, Pr, Nd, Sm, Eu, Gd, Tb, Dy, Ho, Er, Tm, Yb, Y, and Lu, paired with one or more pentavalent (5+) ions selected from the group consisting of Sb, Ta, Nb, and V; with one or more divalent (2+) ions selected from the group consisting of Zn, Mg, and Ca; paired with one or more hexavalent (6+) ions selected from the group consisting of W, and Mo, such that charge compensation is maintained.

In an eighth embodiment of the present invention, the ferroelectric/paraelectric material of the first embodiment is provided, wherein the perovskite structure has an A and B site in the cubic crystalline structure with the A sites being 12 fold coordinated with oxygen atoms and the B site being 6 fold coordinated with oxygen atoms, and wherein the A site can further comprise at least one member selected from the group consisting of one or more monovalent (1+) ions selected from the group consisting of Li, Na, K, Rb and Cs, paired with one or more trivalent (3+) ions selected from the group consisting of La, Pr, Nd, Sm, Eu, Gd, Tb, Dy, Ho, Er, Tm, Yb, and Lu, Y, and combinations thereof, such that charge compensation is maintained in the A site;

the B site can further comprise one or more members selected from the group consisting of one or more trivalent (3+) ions selected from the group consisting of Al, Ga, In, Sc, Pr, Y, Nd, Sm, Eu, Gd, Tb, Dy, Ho, Er, Tm, Yb and Lu; paired with one or more pentavalent (5+) ions selected from the group consisting of Sb, Ta, Nb, and V, and combinations thereof, such that charge compensation is maintained in the B-site; or B can comprise one or more members selected from the group consisting of one or more divalent (2+) ions selected from the group consisting of Zn, Mg, and Ca, paired with one or more hexavalent (6+) ions selected from the group consisting of W, and Mo;

y is greater than 0 and less than 1; and $0 \leq \Delta \leq 0.2$, such that charge compensation is maintained.

In a ninth embodiment of the present invention, a ferroelectric/paraelectric material is provided defined by general formula II:

$$(A_{1-x-z}Ba_xSr_z)B_yTi_{1-y+\Delta}O_3 \qquad \text{II}$$

wherein said material has a perovskite structure having an A and B site in the cubic crystalline structure with the A sites being 12 fold coordinated with oxygen atoms and the B sites being 6 fold coordinated with oxygen atoms;

the A site comprises at least one member selected from the group consisting of one or more monovalent (1+) ions selected from the group consisting of Li, Na, K, Rb and Cs, paired with one or more trivalent (3+) ions selected from the group consisting of La, Pr, Nd, Sm, Eu, Gd, Tb, Dy, Ho, Er, Tm, Yb, Y, and Lu, and combinations thereof, such that charge compensation is maintained in the A site; and the B site comprises one or more members selected from the group consisting of one or more trivalent (3+) ions selected from the group consisting of Al, Ga, In, Sc, Pr, Y, Nd, Sm, Eu, Gd, Tb, Dy, Ho, Er, Tm, Yb and Lu; paired with one or more pentavalent (5+) ions selected from the group consisting of Sb, Ta, Nb, and V, and combinations thereof, such that charge compensation is maintained in the B-site;

B is a combination of divalent (2+) ions paired with hexavalent (6+) ions or is a combination of one or more trivalent (3+) ions paired with one or more pentavalent (5+) ions with a combination of one or more divalent (2+) ions paired with hexavalent (6+) ions;

$0<y<1$;

$0 \leq \Delta \leq 0.2$;

$0 \leq x \leq 1$;

$0 \leq z \leq 1$; and, $0 \leq x+z \leq 1$ such that charge compensation is maintained.

In a tenth embodiment of the present invention, the ferroelectric/paraelectric material of the sixth embodiment above is provided, wherein the perovskite structure has an A and B site in the cubic crystalline structure with the A sites being 12 fold coordinated with oxygen atoms and the B sites being 6 fold coordinated with oxygen atoms, and wherein the B site can further comprise one or more members selected from the group consisting of one or more trivalent (3+) ions selected from the group consisting of Al, Ga, In, Sc, Pr, Y, Nd, Sm, Eu, Gd, Tb, Dy, Ho, Er, Tm, Yb and Lu; paired with one or more pentavalent (5+) ions selected from the group consisting of 5b, Ta, Nb, and V, and combinations thereof, such that charge compensation is maintained in the B-site;

or a combination of trivalent (3+) Al ions paired with pentavalent (5+) Ta ions, represented by $Al_yTa_y$, such that charge compensation is maintained.

In an eleventh embodiment of the present invention, the ferroelectric/paraelectric material of the tenth embodiment above is provided, wherein y is about 0.05.

In a twelfth embodiment of the present invention, the ferroelectric/paraelectric material of the eleventh embodiment above is provided, wherein $\Delta$ is 0.

In a thirteenth embodiment of the present invention, the ferroelectric/paraelectric material of the tenth embodiment above is provided, wherein B can further comprise one or more members selected from the group consisting of one or more trivalent (3+) ions selected from the group consisting of Al, Ga, In, Sc, Pr, Y, Nd, Sm, Eu, Gd, Tb, Dy, Ho, Er, Tm, Yb and Lu; paired with one or more pentavalent (5+) ions selected from the group consisting of Sb, Ta, Nb, and V, and combinations thereof, such that charge compensation is maintained in the B-site; or a combination of trivalent (3+)

Y ions paired with pentavalent (5+) Ta ions represented by $(Y_y, Ta_y)$; such that charge compensation is maintained.

In a fourteenth embodiment of the present invention, the ferroelectric/paraelectric material of the thirteenth embodiment above is provided, wherein y is 0.05.

In a fifteenth embodiment of the present invention, a ferroelectric/paraelectric material for use in tunable devices having the following general formula III:

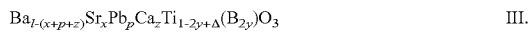

$$Ba_{1-(x+p+z)}Sr_xPb_pCa_zTi_{1-2y+\Delta}(B_{2y})O_3 \qquad \text{III.}$$

wherein $0 \leq p \leq 1$, $0 \leq x \leq 1$, $0 \leq z \leq 1$, $0 \leq (x+p+z) \leq 1$, $0 \leq y \leq 0.5$, $0 \leq \Delta \leq 0.2$ (representing addition of excess Ti), and $B_{2y}$ has charge quantities with a total sum of 8+, and wherein $x+p+z+y+\Delta>0$, B can further comprise one or more members selected from the group consisting of one or more trivalent (3+) ions selected from the group consisting of Al, Ga, In, Sc, Pr, Y, Nd, Sm, Eu, Gd, Tb, Dy, Ho, Er, Tm, Yb and Lu, paired with one or more pentavalent (5+) ions selected from the group consisting of Sb, Ta, Nb, and V, and combinations thereof, or B is one or more divalent (2+) ions selected from the group consisting of Zn, Mg, and Ca, paired with one or more hexavalent (6+) ions selected from the group consisting of W, and Mo, or B is a combination of said 3+ and 5+ ions paired with said 2+ and 6+ ions such that charge compensation is maintained in the B-site; and said material is in the form of a single phase solid solution of a perovskite having a crystalline structure and charge balanced constitutents.

In a sixteenth embodiment of the present invention, the ferroelectric/paraelectric material of the fifteenth embodiment above is provided, wherein B can further comprise one or more members selected from the group consisting of one or more trivalent (3+) ions selected from the group consisting of Al, Ga, In, Sc, Pr, Y, Nd, Sm, Eu, Gd, Tb, Dy, Ho, Er, Tm, Yb and Lu, paired with one or more pentavalent (5+) ions selected from the group consisting of Sb, Ta, Nb, and V, and combinations thereof, such that charge compensation is maintained in the B-site;

or combinations of trivalent ion element pairs with individual pentavalent ion elements, and combinations of divalent ion element pairs with individual or combinations of hexavalent ion elements.

In a seventeenth embodiment of the present invention, the ferroelectric/paraelectric material of the fifteenth embodiment above is provided, wherein B can further comprise one or more members selected from the group consisting of one or more trivalent (3+) ions selected from the group consisting of Al, Ga, In, Sc, Pr, Y, Nd, Sm, Eu, Gd, Tb, Dy, Ho, Er, Tm, Yb and Lu, paired with one or more pentavalent (5+) ions selected from the group consisting of Sb, Ta, Nb, and V, and combinations thereof, such that charge compensation is maintained in the B-site; and/or divalent ion element pairs with hexavalent ion element pairs, combinations of trivalent ion element pairs with individual pentavalent ion elements and combinations of divalent ion element pairs with individual or combinations of hexavalent ion elements.

In an eighteenth embodiment of the present invention, the ferroelectric/paraelectric material of the fifteenth embodiment above is provided, wherein x=0.4, B can comprise a trivalent ion paired with a pentavalent ion, B has a charge 3+, and 5+, 0<y<0.5 and $0 \leq p \leq 1$.

In a nineteenth embodiment of the present invention, the ferroelectric/paraelectric material of the fifteenth embodiment above is provided, wherein charge-compensated substitutions are made for Ti sites in the material.

In a twentieth embodiment of the present invention, the ferroelectric/paraelectric material of the eighteenth embodiment above is provided, wherein charge-compensated substitutions are made for Ti sites in the material.

In a twenty first embodiment of the present invention, the ferroelectric/paraelectric material of the fifteenth embodiment above is provided, wherein charge-compensated substituents for Ti sites comprise Ge, Sn, Zr, Al, Ga, In, Sb, Sc, Ta, V, Y, Pr, Nd, Sm, Eu, Gd, Tb, Dy, Ho, Er, Tm, Yb, Lu, Nb, W, Mo, Zn, Mg, Ca, and combinations thereof.

In a twenty second embodiment of the present invention, the ferroelectric/paraelectric material of the twentieth embodiment is provided, wherein charge-compensated substituents for Ti comprise Ge, Sn, Zr, Al, Ga, In, Sb, Sc, Ta, V, Y, Pr, Nd, Sm, Eu, Gd, Tb, Dy, Ho, Er, Tm, Yb, Lu, Nb, W, Mo, Zn, Mg, Ca, and combinations thereof.

In a twenty third embodiment of the present invention, the ferroelectric/paraelectric material of the fifteenth embodiment above is provided, wherein said material has a one-to-one substitution of Sn, Ge, or Zr for Ti therein, or combinations of such substitutions for Ti.

In a twenty fourth embodiment of the present invention, the ferroelectric/paraelectric material of the nineteenth embodiment above is provided, wherein said material has a one-to-one substitution of Sn, Ge, or Zr for Ti therein, or combinations of such substitutions for Ti.

In a twenty fifth embodiment of the present invention, the ferroelectric/paraelectric material of the fifteenth embodiment above is provided, wherein B can be a trivalent ion paired with a pentavalent ion or a divalent ion paired with a hexavalent ion, x=0.1, 0<y<0.5, $0 \leq p \leq 0.9$.

In a twenty sixth embodiment of the present invention, the ferroelectric/paraelectric material of the sixteenth embodiment above is provided, wherein charge-compensated substituents for Ti comprise Ge, Sn, Zr, Al, Ga, In, Sb, Sc, Ta, V, Y, Pr, Nd, Sm, Eu, Gd, Tb, Dy, Ho, Er, Tm, Yb, Lu, Nb, W, Mo, Zn, Mg, Ca, and combinations thereof.

In a twenty seventh embodiment of the present invention, the ferroelectric/paraelectric material of the seventeenth embodiment above is provided, wherein charge-compensated substituents for Ti comprise Ge, Sn, Zr, Al, Ga, In, Sb, Sc, Ta, V, Y, Pr, Nd, Sm, Eu, Gd, Tb, Dy, Ho, Er, Tm, Yb, Lu, Nb, W, Mo, Zn, Mg, Ca, and combinations thereof.

In a twenty eighth embodiment of the present invention, the ferroelectric/paraelectric material of the fifteenth embodiment above is provided, wherein B can be a trivalent ion paired with a pentavalent ion or a divalent ion paired with a hexavalent ion, x=0.2, 0<y<0.5, $0 \leq p \leq 0.8$.

In a twenty ninth embodiment of the present invention, the ferroelectric/paraelectric material of the twenty first embodiment above is provided, wherein charge-compensated substituents for Ti comprise Ge, Sn, Zr, Al, Ga, In, Sb, Sc, Ta, V, Y, Pr, Nd, Sm, Eu, Gd, Tb, Dy, Ho, Er, Tm, Yb, Lu, Nb, W, Mo, Zn, Mg, Ca; and combinations thereof.

In a thirtieth embodiment of the present invention, the ferroelectric/paraelectric material of the fifteenth embodiment above is provided, wherein B can be a trivalent ion paired with a pentavalent ion or a divalent ion paired with a hexavalent ion, x=0.3, $0<y \leq 0.5$ and $0 \leq p \leq 0.7$.

In a thirty first embodiment of the present invention, the ferroelectric/paraelectric material of the fifteenth embodiment above is provided, wherein said material is $Ba_{0.6}Sr_{0.4}Y_{0.05}Ta_{0.05}Ti_{0.90}O_3$.

In a thirty second embodiment of the present invention, the ferroelectric/paraelectric material of the fifteenth embodiment above is provided, wherein said material is $Ba_{0.9}Sr_{0.1}Sc_{0.05}Ta_{0.05}Ti_{0.9}O_3$.

In a thirty third embodiment of the present invention, the ferroelectric/paraelectric material of the fifteenth embodiment above is provided, wherein said material is $Ba_{0.9}Sr_{0.1}Sc_{0.05}Ta_{0.05}Ti_{0.99}O_3$.

In a thirty fourth embodiment of the present invention, a patch antenna is provided comprising the ferroelectric/paraelectric material of the fifteenth embodiment above.

In a thirty fifth embodiment of the present invention, a phased array antenna is provided comprising the ferroelectric/paraelectric material of the fifteenth embodiment above.

In a thirty sixth embodiment of the present invention, a true time delay device is provided comprising the ferroelectric/paraelectric material of the fifteenth embodiment above.

In a thirty seventh embodiment of the present invention, a tunable filter is provided comprising the ferroelectric/paraelectric material of the fifteenth embodiment above.

In a thirty eighth embodiment of the present invention, an impedance transformer is provided comprising the ferroelectric/paraelectric material of the fifteenth embodiment above.

In a thirty ninth embodiment of the present invention, an oscillator is provided comprising the ferroelectric/paraelectric material of the fifteenth embodiment above.

In a fourtieth embodiment of the present invention, a phase shifter device is provided comprising the ferroelectric/paraelectric material of the fifteenth embodiment above.

In a forty first embodiment of the present invention, the ferroelectric/paraelectric material of the fifteenth embodiment above is provided, wherein said material has a dielectric constant ($\epsilon$) of greater than 1 and less than or equal to 1,000,000.

In a forty second embodiment of the present invention, the ferroelectric/paraelectric material of the eighteenth embodiment above is provided, wherein said material has a dielectric constant of greater than 1 and less than or equal to 1,000,000.

In a forty third embodiment of the present invention, the ferroelectric/paraelectric material of the fifteenth embodiment above is provided, wherein said material has a tunability greater than 1% but less than 100% at 1 V/µm.

In a forty fourth embodiment of the present invention, the ferroelectric/paraelectric material of the eighteenth embodiment above is provided, wherein said material has a tunability greater than 1% but less than 100% at 1 V/µm.

In a forty fifth embodiment of the present invention, the ferroelectric/paraelectric material of the fifteenth embodiment above is provided, wherein said material has a temperature operating range of −75° C. to 100° C.

In a forty sixth embodiment of the present invention, the ferroelectric/paraelectric material of the eighteenth embodiment above is provided, wherein said ferroelectric/paraelectric material has a temperature operating range of −75° C. to 100° C.

In a forty seventh embodiment of the present invention, the ferroelectric/paraelectric material of the fifteenth embodiment above is provided, wherein said material has an Sr/Ba ratio of ⅑.

In a forty eighth embodiment of the present invention, the ferroelectric/paraelectric material of the eighteenth embodiment above is provided, wherein said material has an Sr/Ba ratio of ⅑.

In a forty ninth embodiment of the present invention, an electric field tunable ferroelectric/paraelectric material is provided comprising $Ba_{0.9}Sr_{0.1}X_{0.05}Z_{0.05}Ti_{0.90}O_3$, wherein X is one or more members selected from the group consisting of Sc, Ga, Al, In, Y, Lu, Pr, Nd, Sm, Eu, Gd, Tb, Dy, Ho, Er, Tm, or Yb, and combinations thereof, and Z is one or more members of the group consisting of Ta, V, Nb, and Sb.

In a fiftieth embodiment of the present invention, an electric field tunable FE/PE material is provided comprising:
$Ba_{0.9}Sr_{0.1}X_{0.03}Z_{0.03}Ti_{0.94}O_3$, wherein (X and Z) are one or more members selected from the group consisting of (Y,Ta), (In,Ta), (In,Sb), (Ga,Ta), (Ga,V), (Ga,Sb), (Al,Ta), (Al,Sb), (Sc,Ta) and (Sc,Sb); and combinations thereof.

In a fifty first embodiment of the present invention, an electric field tunable FE/PE material is provided comprising $Ba_{0.8}Sr_{0.2}X_{0.05}Z_{0.05}Ti_{0.9}O_3$, wherein (X,Z) is one or more members selected from the group consisting of (Y,Ta), (In,Ta), (In,Sb), (Ga,Ta), (Ga,V), (Ga,Sb), (Al,Sb), and (Al,Ta).

In a fifty second embodiment of the present invention, an electric field tunable FE/PE material is provided comprising $Ba_{0.8}Sr_{0.2}X_{0.1}Z_{0.8}Ti_{0.8}O_3$, wherein (X,Z) is one or more members selected from the group consisting of (Y,Ta), (In,Ta), (In,Sb), (Ga,Ta), (Ga,V), (Ga,Sb), (Al,Sb), and (Al,Ta).

In a fifty third embodiment of the present invention, an electric field tunable FE/PE material is provided comprising $Ba_{0.7}Sr_{0.3}X_{0.05}Ti_{0.9}O_3$, wherein (X,Z) is one or more members selected from the group consisting of (Y,Ta), (In,Ta), (In,Sb), (Ga,Ta), (Ga,V), (Ga,Sb), (Al,Sb), and (Al,Ta).

In a fifty fourth embodiment of the present invention, an electric field tunable FE/PE material is provided comprising $Ba_{0.7}Sr_{0.3}X_{0.1}Z_{0.1}Ti_{0.8}O_3$, wherein (X,Z) is one or more members selected from the group consisting of (Y,Ta), (In,Ta), (In,Sb), (Ga,Ta), (Ga,V), (Ga,Sb), (Al,Sb), and (Al,Ta).

In a fifty fifth embodiment of the present invention, an electric field tunable ferroelectric/paraelectric material is provided comprising $BaX_{0.05}Z_{0.05}Ti_{0.9}O_3$, wherein (X,Z) is one or more members selected from the group consisting of (Mg, W), (Mg, Mo), (Ca, Mo) and (Sc, Sb).

In a fifty sixth embodiment of the present invention, an electric field tunable ferroelectric/paraelectric material is provided comprising $BaX_{0.1}Z_{0.1}Ti_{0.8}O_3$, wherein (X,Z) is one or more members selected from the group consisting of (Sc,Sb) and (Mg,Mo).

In a fifty seventh embodiment of the present invention, an electric field tunable ferroelectric/paraelectric material is provided comprising $Ba_{0.8}Ca_{0.2}X_{0.05}Z_{0.05}Ti_{0.9}O_3$, wherein (X,Z) is one or more members selected from the group consisting of (Ga,Sb), (Ga,Ta), (Sc,Sb), (Sc,Ta), (In,Sb), and (In,Ta).

In a fifty eighth embodiment of the present invention, an electric field tunable ferroelectric/paraelectric material is provided comprising $Ba_{0.8}Ca_{0.2}X_{0.1}Z_{0.1}Ti_{0.8}O_3$, wherein (X,Z) is one or more members selected from the group consisting of (Ga,Sb), (Ga,Ta), (Sc,Sb), (Sc,Ta), (In,Sb), and (In,Ta).

In a fifty ninth embodiment of the present invention, an electric field tunable ferroelectric/paraelectric material is provided comprising $BaIn_{0.067}W_{0.033}Ti_{0.9}O_3$ and $Ba_{0.90}Ca_{0.10}In_{0.067}W_{0.033}Ti_{0.9}O_3$.

In a sixtieth embodiment of the present invention, an electric field tunable ferroelectric/paraelectric material is provided comprising $Ba_{0.8}Ca_{0.1}Sr_{0.1}X_{0.05}Z_{0.05}Ti_{0.9}O_3$, wherein (X,Z) is one or more members selected from the group consisting of (Ca,Mo) and (Ca,W).

In a sixty first embodiment of the present invention, an electric field tunable ferroelectric/paraelectric material is provided comprising $Ba_{0.8}Ca_{0.1}Sr_{0.1}X_{0.1}Z_{0.1}Ti_{0.8}O_3$, wherein (X,Z) is one or more members selected from the group consisting of (Ca,Mo) and (Ca,W).

In a sixty second embodiment of the present invention, an electric field tunable ferroelectric/paraelectric material is provided comprising $Ba_{0.9}Sr_{0.1}Sc_{0.05}Ta_{0.05}Ti_{0.9+\Delta}O_3$, wherein $\Delta$=0.01, 0.03, 0.05, 0.07, or 0.09.

In a sixty third embodiment of the present invention, the ferroelectric/paraelectric material of the forty ninth embodiment above is provided, wherein the material has a tunability greater than 1% but less than 100% at 1 V/μm.

In a sixty fourth embodiment of the present invention, the ferroelectric/paraelectric material of the fiftieth embodiment above is provided, wherein the material has tunability greater than 1% but less than 100% at 1 V/μm.

In a sixty fifth embodiment of the present invention, the ferroelectric/paraelectric material of the forty ninth embodiment above is provided, wherein said material has a dielectric constant of between 1 and 20,000 at 1 MHz and a tunability greater than 1% but less than 100% at 1 V/μm.

In a sixty sixth embodiment of the present invention, the ferroelectric/paraelectric material of the fiftieth embodiment above is provided, wherein said material has a dielectric constant of between 1 and 20,000 at 1 MHz and a tunability greater than 1% but less than 100% at 1 V/μm.

In a sixty seventh embodiment of the present invention, a ferroelectric/paraelectric material is provided comprising $Ba_{0.9}Sr_{0.1}X_{0.05}Z_{0.05}Ti_{0.90}O_3$, wherein X is one or more members selected from the group consisting of Y and Lu, Z=Ta, and said material has a dielectric constant of between 1 and 20,000 at 1 MHz and a tunability greater than 1% but less than 100% at 1 V/μm.

In a sixty eighth embodiment of the present invention, a ferroelectric/paraelectric material is provided comprising $Ba_{0.9}Sr_{0.1}X_{0.03}Z_{0.03}Ti_{0.94}O_3$, wherein (X,Z) is one or more members selected from the group consisting of (Y,Ta), (In,Ta), (In,Sb), (Ga,Ta), (Ga,V), and (Sc,Sb), material having a dielectric constant of between 1 and 20,000 at 1 MHz and a tunability greater than 1% but less than 100% at 1 V/μm.

BRIEF DESCRIPTION OF THE DRAWINGS

FIG. 1 is a perspective view of an $ABO_3$ perovskite structure of the present invention, wherein charge-compensating substitutions for Ti occupy the B (middle) site. site.

FIG. 4 is a table, whose results illustrate the finding that undoped BST outperforms BST doped with MgO at a specific temperature (in this case room temperature).

FIG. 12 is a table illustrating the composition of the 3% and 5% substitution of charge compensating ion pairs for 6% and 10% of Ti in the samples synthesized according to the present invention.

FIG. 14(a) is a graph of dielectric constant vs. temperature at 1 MHz for 3% substitutions of the charge compensating pair, (X,V), with X=Y, Al, Ga, Sc, Sb, and In for 6% of Ti in the FE/PE material, that is, $Ba_{0.6}Sr_{0.4}X_{0.03}V_{0.03}Ti_{0.94}O_3$, of the present invention.

FIG. 14(b) is a graph of percent tunability divided by electric field vs. temperature at 1 MHz for 3% substitutions of the charge compensating pair, (X,V), with X=Y, Al, Ga, Sc, Sb, and In for 6% of Ti in the FE/PE material, that is, $Ba_{0.6}Sr_{0.4}X_{0.03}V_{0.03}Ti_{0.94}O_3$, of the present invention.

FIG. 16(a) is a graph of dielectric constant vs. temperature at 1 MHz for 3% substitutions of the charge compensating pair, (X,Ta), with X=Ga, In, Al, and Y for 6% of Ti in the FE/PE material, that is, $Ba_{0.6}Sr_{0.4}X_{0.03}Ta_{0.03}Ti_{0.94}O_3$ of the present invention.

FIG. 16(b) is a graph of percent tunability divided by electric field vs. temperature at 1 MHz for 3% substitutions of the charge compensating pair, (X,Ta), with X=Ga, In, Al, and Y for 6% of Ti in the FE/PE material $Ba_{0.6}Sr_{0.4}X_{0.03}Ta_{0.03}Ti_{0.94}O_3$ of the present invention.

FIG. 24 is a table of dielectric constants, tunabilities, temperature ranges, and critical temperature for various reference BST samples, as well as samples of FE/PE BST materials of the present invention which have a Ba/Sr ratio of 6/4.

FIG. 25 is a table of dielectric constants, tunabilities, temperature ranges, and critical temperature for various reference BST samples, as well as samples of FE/PE BST materials of the present invention which have a Ba/Sr ratio of 9/1, 8/2, 6/4 as indicated.

FIG. 26 is a table of figures of merit (FOM) for the samples shown in FIGS. 12–18 above.

FIG. 27 is a table of $\epsilon(E=0)$ and loss tangents at 1 kHz for the samples shown in FIG. 26 above.

DETAILED DESCRIPTION OF THE INVENTION

Figure 2:
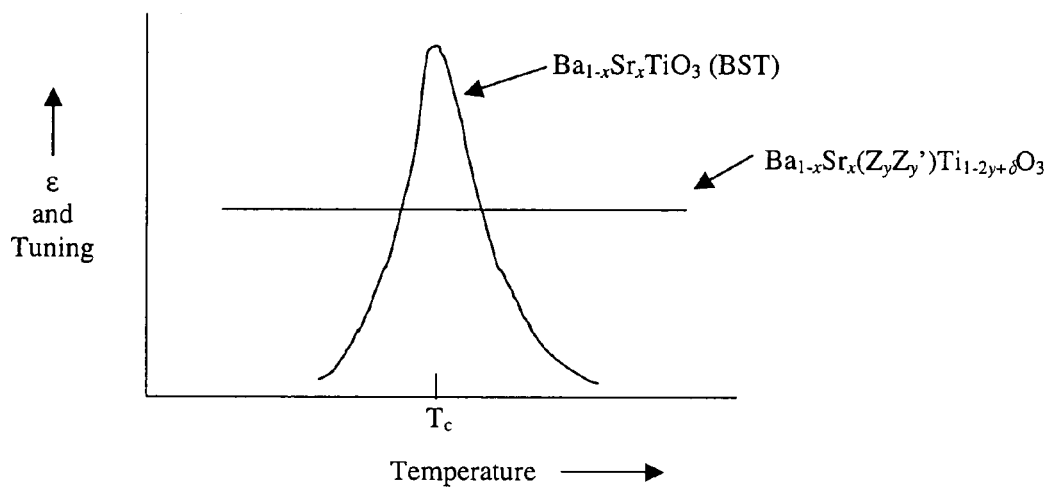
FIG. 2 is a graph illustrating change in dielectric constant and tunability vs. temperature for a conventional BST vs. the charge-compensated substituted BST of the present invention.

FE/PE materials may be used, but not limited to use, in electric-field tunable devices such as radio-frequency (RF), microwave, and millimeter wave phase shifters, true time delay devices, impedance transformers and tunable filters. The function of such FE/PE materials relies on the change in the effective electrical length of the device due to a change in the material permittivity (dielectric constant) induced by applying a dc electric field with field strength in the range of 0.1 to 100 V/μm in the FE/PE material. From a device design and operation point-of-view, parameters affecting the function of such phase shifters are the real permittivity (from hereon also called dielectric constant, $\epsilon$), tunability, and microwave loss of the material as functions of both temperature and frequency. The ability to impedance match to the phase shifter device is improved if the permittivity of materials used is relatively low. However, high $\epsilon$ doesn't necessarily dictate a decrease in phase shifter performance.

Large tunability is desirable for shortening the length of line needed to provide the identical phase shift for each fixed electric field strength in a phased-array antenna, a common phase shifter device in which the materials of the present invention may be utilized. Lower loss tangent materials can further reduce phase shifter losses in the RF, microwave and millimeter wave range if appropriate tunability can be maintained. Dielectric constant, tunability and loss tangent can vary significantly with both frequency and temperature. Further, all three parameters of a FE/PE material increase and peak as the Curie temperature, $T_c$, is approached. If the Curie transition is sharp, the material will have an undesirably limited temperature range of operation, because the tunability rapidly approaches zero for temperatures away from the Curie point. Below the Curie temperature, in the FE regime, the material again exhibits reduced tunability and losses can be high. Thus, FE phase shifters are typically operated at $T>T_c$, where they are paraelectric (PE).

The present invention provides new FE/PE single-phase materials with dielectric constants and tunabilities that are relatively insensitive to temperature, and that can operate successfully and efficiently over the entire military specification temperature range of −50° C. to 100° C. This is achieved by the provision herein of an extended array of compounds with dilute charge-balanced substitutions into the Ti site (also referred to as the B site herein) of $Ba_{1-x}Sr_xTiO_3$.

These FE/PE single-phase materials have primarily dilute charge-compensated substitutions, which are made into the Ti site, as shown in FIG. 1, of $Ba_{1-x}Sr_xTiO_3$ having the perovskite structure. Limiting the substitution into the Ti site provides for a lower, more constant dielectric constant (over a broad temperature range), provides a single-phase structure, primarily cubic structure and provides a FE/PE material very well suited for pulsed-laser thin-film deposition and other physical vapor deposition methods for fabrication of a device. Such FE/PE materials include but are not limited to materials with one-to-one substitution of $Sn^{4+}$, $Ge^{4+}$, or $Zr^{4+}$ for $Ti^{4+}$, $Ta^{5+}$ as the $Z^{5+}$ ion and $Sc^{3+}$ as the $X^{3+}$ ion, as well as materials with a suitable substitution of an acceptor and a donor oxidation state of 4−n and 4+n, respectively (n=1, 2 or 3) for two $Ti^{4+}$.

Previous investigations have been made concerning dilute additions of various elements into ferroelectric materials. However, such additions are not direct substitutions into the ferroelectric lattice, as herein, because they were not properly charge-compensated. That is, additions typically result in the formation of a second phase material. The physical properties, microstructure, Curie temperature, and electrical properties (including dielectric constant, tunability and loss tangent) of this second phase material can and typically do significantly differ from the properties of ferroelectric materials having direct charge-balanced substitutions into the lattice, such as the materials of the present invention.

Selecting materials having a cubic phase enhances control of crystallographic orientations in the deposition of thin films. Avoiding non-cubic phases in the many composition systems, phase diagrams, precludes the engineering complexity of dealing with a highly anisotropic dielectric constant, especially in the use of textured materials, single crystals and single crystal-like thin films for RF, microwave and millimeter-wave devices. However, for RF, microwave and millimeter-wave device applications, non-cubic materials are permissible and can be readily used when the "effective" dielectric constant appears isotropic with respect to the microwave radiation. "Effective" isotropic behavior of the dielectric constant simplifies device design and fabrication issues. Depending upon the application, there are procedures that may be used to help make the "effective" dielectric constant of anisotropic materials appear isotropic with respect to the microwave radiation for the device.

As shown in FIG. 2, BST with no substitution in the Ti site is shown to have a peak in dielectric constant and tunability at the Curie temperature, and a rapid decline in both characteristics as temperatures decrease or increase away from same. In contrast, BST with a charge-compensated substitution, as provided in the present invention, is shown to have a more constant dielectric constant and tunability throughout a broad range of temperatures.

For the single-ion isovalent substitutions for Ti, some broadening occurs in the FE transitions and tunabilities of Ge and Zr, for substitution levels of y=0.03 and Δ=0 in general formula II where x=0.6 and z=0.4, but maximum values of $E(E=0)$ are smaller but within a factor of two of that for $Ba_{0.6}Sr_{0.4}TiO_3$, and $T_c^{E=0}$ for these samples remains within a range of $-10°$ C.$\leq T_c^{E=0} \leq 2°$ C. compared to 5° C. for $Ba_{0.6}Sr_{0.4}TiO_3$.

Specific embodiments of the present invention include $Ba_{0.6}Sr_{0.4}Al_{0.03}V_{0.03}Ti_{0.94}O_3$ and $Ba_{0.6}Sr_{0.4}Y_{0.03}V_{0.03}Ti_{0.94}O_3$ as FE/PE materials for which $T_c^{E=0} \sim -10°$ C., the dielectric constant at zero electric field, $\in(0)$, is increased by a factor of five, and the maximum of the ratio of the tunability to the constant electric field is increased by more than 1.5 relative to the respective values for a similarly prepared $Ba_{0.6}Sr_{0.4}TiO_3$ sample. Such materials have, compared to the unsubstituted $Ba_{0.6}Sr_{0.4}TiO_3$, a broadened FE transition, a $T_c$ which is shifted to a lower temperature, and an increased range of temperatures over which tunability is observed.

A further preferred embodiment of the present invention provides a FE/PE material comprising $Ba_{0.6}Sr_{0.4}Y_{0.05}Ta_{0.05}Ti_{0.90}O_3$, which is highly tunable, has a low $\in$, and a low variation in $\in$ over the entire military specification range of temperature ($-50°$ C. to 100° C.). At 1 MHz sampling frequency, the ratio of the tunability to the constant electric field, the dielectric constant at zero field, and a figure of merit computed from the ratio of the change in $\in$ due to field over the change due to temperature variation have ranges of 2–14%-μm-$V^{-1}$, 350–850, and 2.5–17.5° C.-μm-$V^{-1}$, respectively, over the military specification range of temperatures.

The room temperature microwave properties are found to be competitive with those of a $Ba_{0.6}Sr_{0.4}TiO_3/MgO$ composite with a ⅔-weight-% ratio of MgO. The $Ba_{0.6}Sr_{0.4}Y_{0.05}Ta_{0.05}Ti_{0.90}O_3$ is PE over the entire military specification range, whereas $T_c$ (below which losses are expected to be high) lies within the military specification temperature range for the composite.

Furthermore, a significant advantage of the materials of the present invention here over composites with low $\in(0)$ is their single-phase structure, making them better suited for pulsed-laser thin-film deposition. Such thin-film deposition enables production of very small, lightweight devices, which are now preferred in the field. In general, the dilute substitutions prepared by the present inventors have a strong effect on the temperature dependence (temperature coefficient of $\in$) of the dielectric properties in the materials with binary substitutions and combinations of these binary substitutions. It is believed that possible mechanisms for this effect could involve changes in the ordering of charge states or in the symmetries of charge configurations that could affect the local electric fields and polarization in the material.

Figure 3:
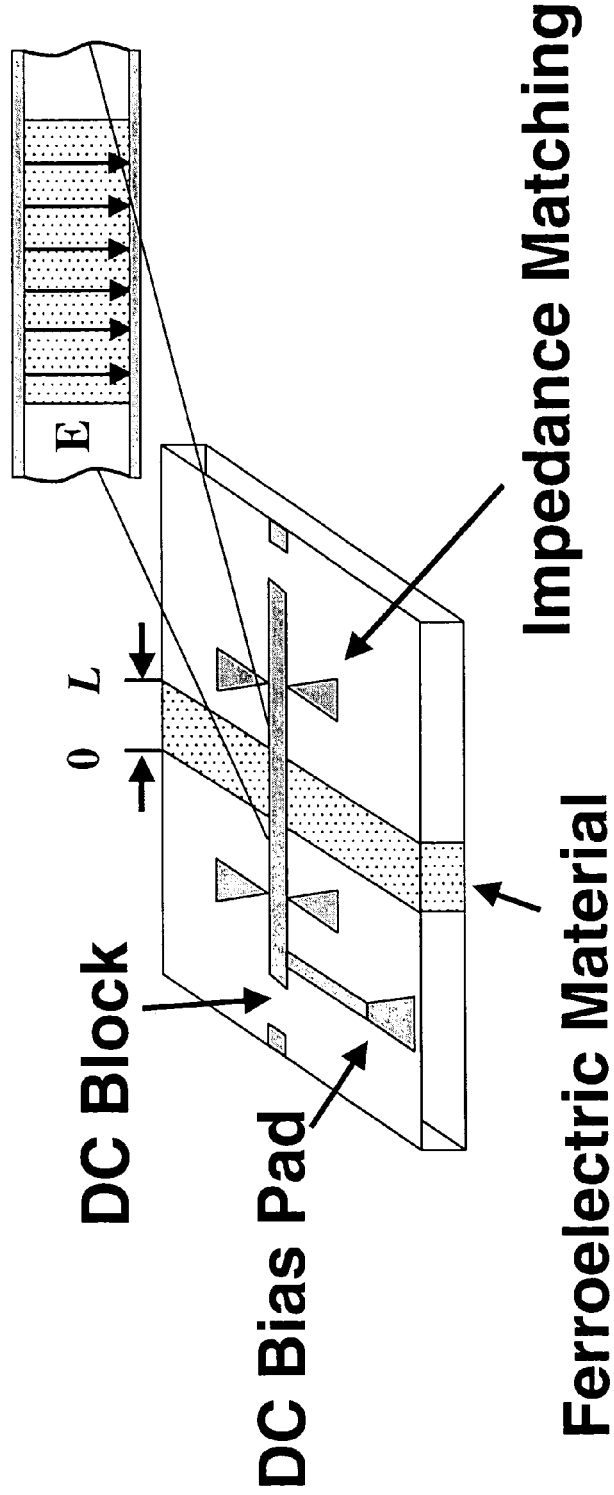
FIG. 3 is a perspective view of a FE/PE microwave microstrip phase shifter device, incorporating the FE/PE material of the present invention therein.

The FE/PE materials of the present invention may be utilized in phase shifter, true time delay devices, tunable filters, impedance transformers and other tunable RF devices. An example of same, a FE/PE microwave phase shifter according to the present invention, is shown in FIG. 3 herein, wherein the FE/PE material of the present invention is imbedded within a DC block. The DC block additionally has a bias pad as a coating thereon, that is in contact with the FE/PE material. Impedance matching is additionally provided.

In another example of a FE/PE phase shifter device, FIG. 4 illustrates the characteristics of a 10 GHz phase shifter using a microstrip design with a 0.003 inch thick BST/MgO composite material, a 0.003 inch wide 1 oz. copper line and a bias condition of 2 V/μm. Two such devices, one doped and one undoped, were theoretically modeled, the results of these tests being shown in FIG. 4 herein. The results of these tests demonstrate that undoped, BST-FE material outperforms BST-FE material doped with MgO at room temperature. However, BST doped with MgO will outperform undoped BST over the military specification temperature range due to the broadened transition. Thus, it was discovered by the present inventors that doping of the BST with certain elements broadens the transition, an important characteristic in real life applications.

PREPARATION EXAMPLES

Charge-balanced compounds with the generalized formulas, $Ba_{0.6}Sr_{0.4}X_y^{3+}Z_y^{5+}Ti_{1-2y}O_3$ and $Ba_{0.6}Sr_{0.4}X_y^{4+}Ti_{1-y}O_3$, were synthesized along with a control sample of $Ba_{0.6}Sr_{0.4}TiO_3$ (BST64). $X^{3+}$, $Z^{5+}$, and $X^{4+}$ refer to the ions of the elements that are substituting for Ti. Goldschmidt's tolerance factor and the Clausius-Mossotti relation were used as guides in choosing substitution ions. Appropriate carbonates or oxides of the constituent elements, 99.9% pure or better, were combined by weight percent to obtain the proper charge compensation and stoichiometric contents, then mixed, ground, pressed (5 kPSI), and calcined at 1100° C. for over 8 hours. Samples were reground and then isostatically pressed at 50 kPSI followed by sintering between 1350° C. and 1550° C. for 22–70 h.

Density data shows ~80–95% was the typical range of volume densities, and helium pycnometer measurements determined that the structural density is 97–99%. The compositions of the various samples prepared as described above are shown in Table II, FIG. 12 herein, with the 3 and 6 atomic % substitutions for Ti grouped into one and three sets, respectively. The control sample and the single-ion isovalent substitutions for $Ti^{4+}$ are in one set and the samples with the same Z atom (V, Sb, or Ta) in the other three sets. There are two samples with 10 atomic % substitution for Ti, one using $Sc^{3+}$ and $Ta^{5+}$ and the other using $Y^{3+}$ and $Ta^{5+}$. An additional sample of 40 weight % BST64 and 60 weight % MgO (BSTMgO) was obtained, which was prepared according to the procedures outlined in *Integrated Ferroelectrics*, J. Synowcznski, L.C. Sengupta and L.H. Chiu, 22, 861 (1998).

Figure 5:
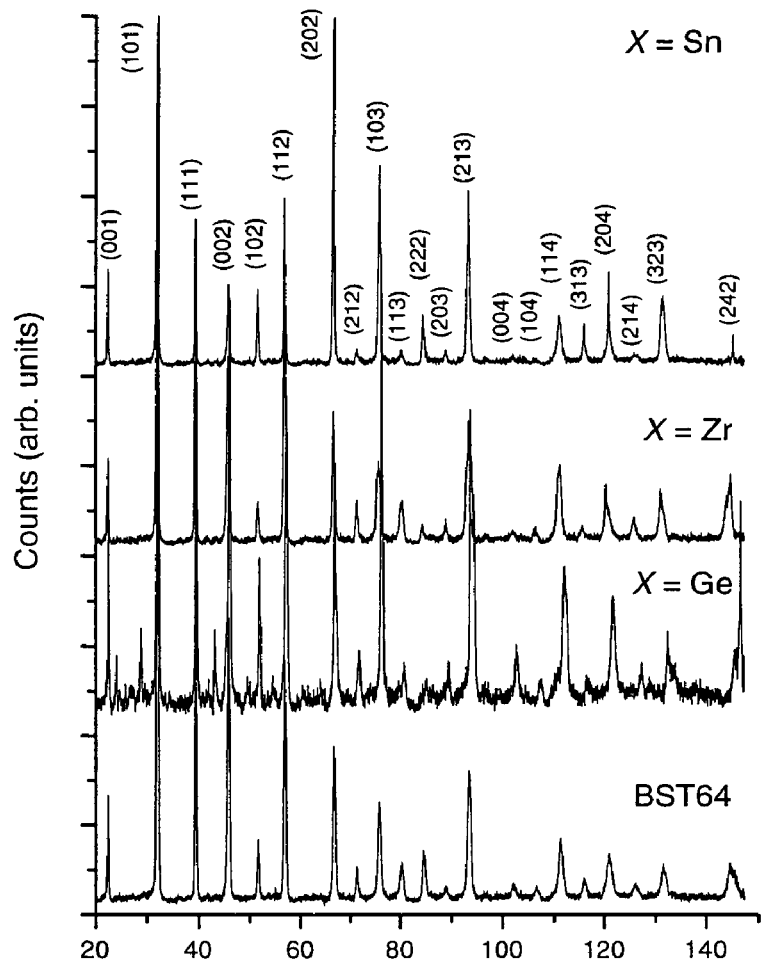
FIG. 5 is an X-ray diffraction pattern of 2θ scans for 3% substitutions of $X^{4+}$ for 3% of Ti in the FE/PE material of the present invention.
Figure 6:
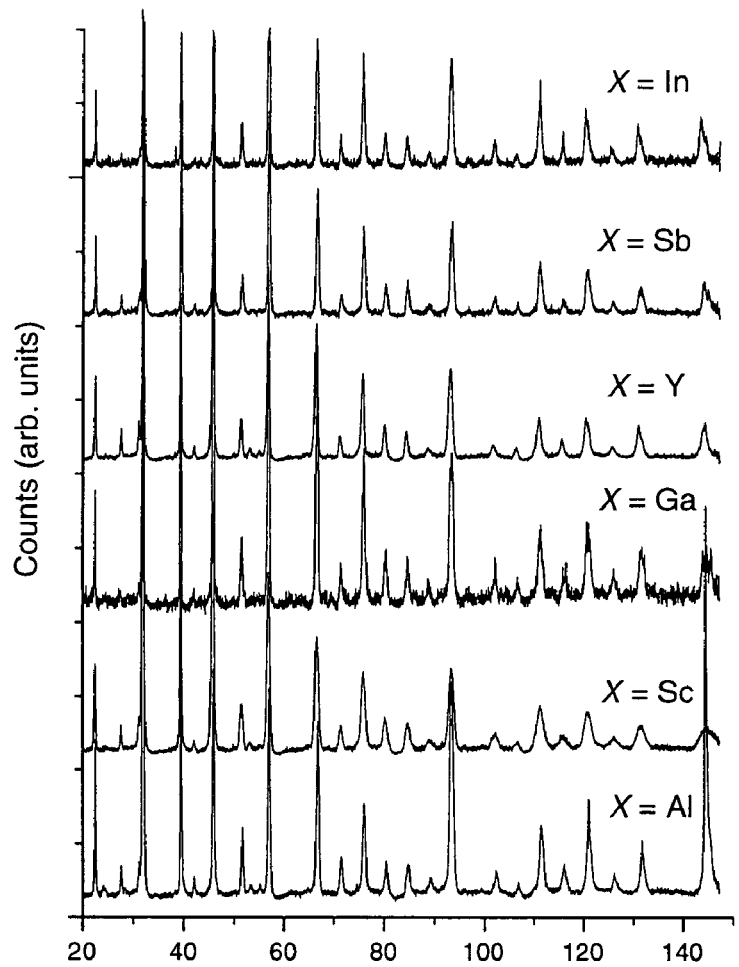
FIG. 6 is an X-ray diffraction pattern of 2θ scans for 3% substitutions of the charge compensating pair, (X,V), for 6% of Ti in the FE/PE material of the present invention.
Figure 7:
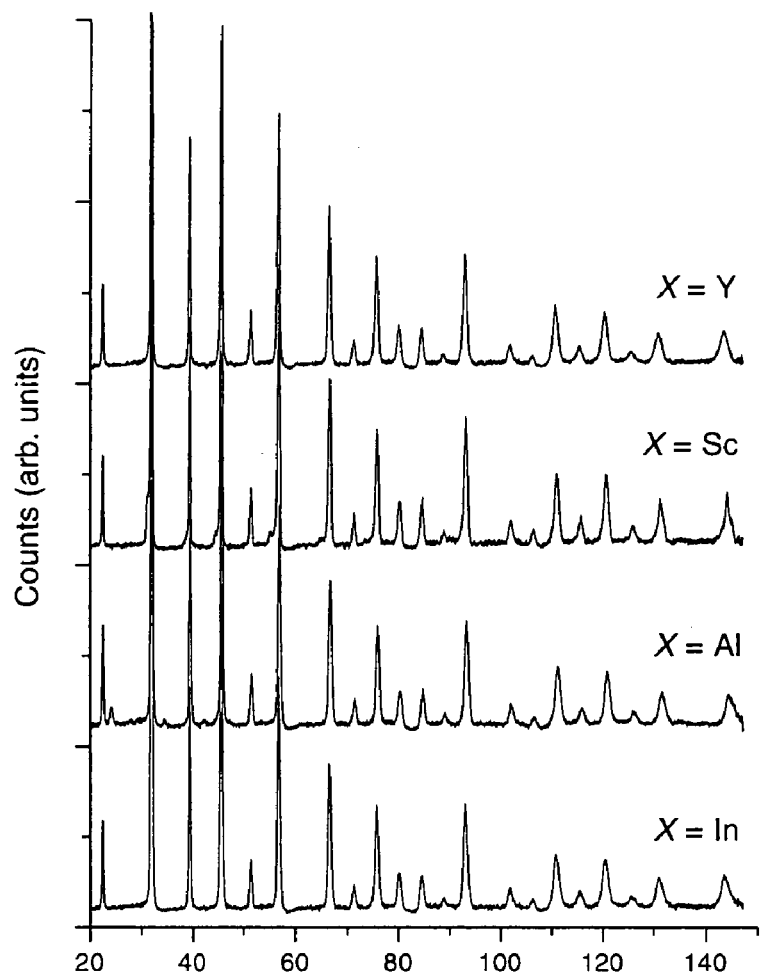
FIG. 7 is an X-ray diffraction pattern of 2θ scans for 3% substitutions of the charge compensating pair, (XSb), for 6% of Ti in the FE/PE material of the present invention.
Figure 8:
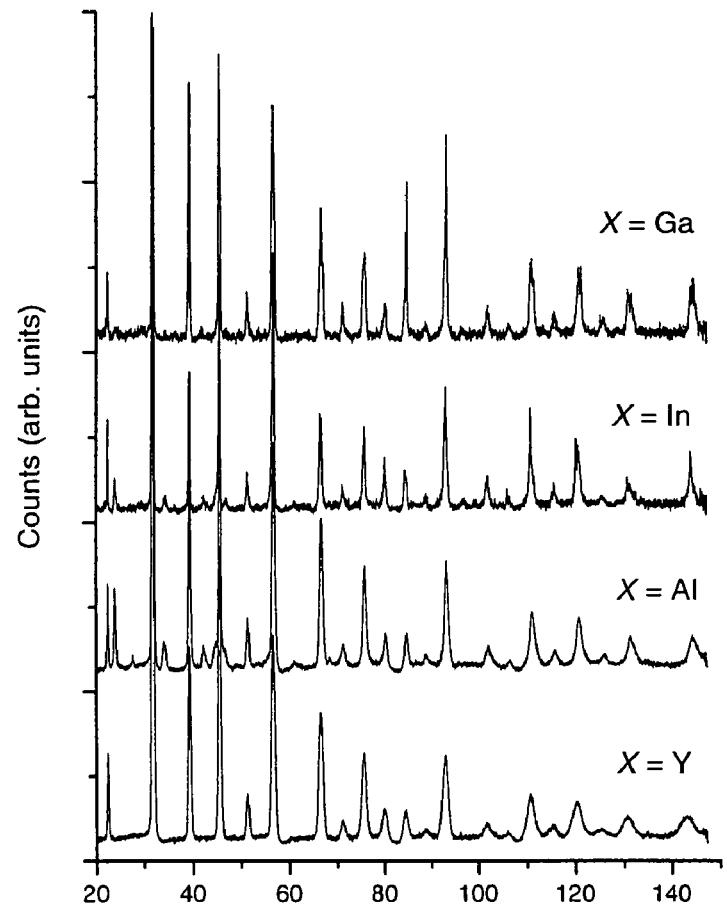
FIG. 8 is an X-ray diffraction pattern of 2θ scans for 3% substitutions of the charge compensating pair, (X,Ta), for 6% of Ti in the FE/PE material of the present invention.
Figure 9:
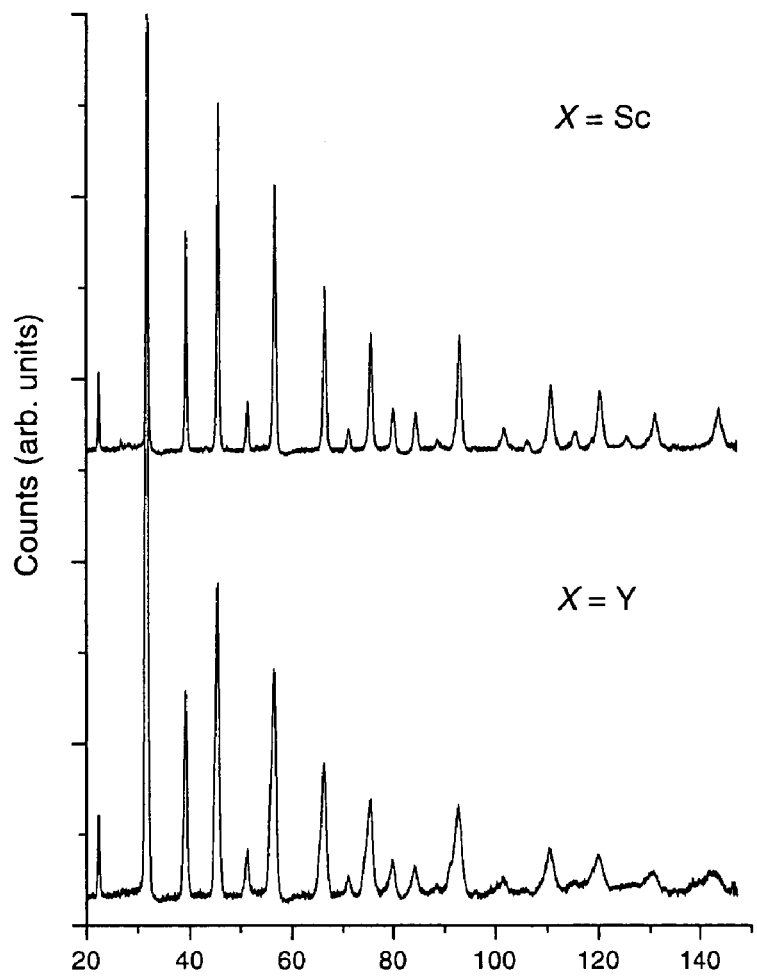
FIG. 9 is an X-ray diffraction pattern of 2θ scans for 5% substitutions of the charge compensating pair, (X,Ta), for 10% of Ti in the FE/PE material of the present invention.

X-ray diffraction θ-2θ scans are shown in FIGS. 5–9 herein for the 3 and 6% substitutions described above. The Miller indices (hkl) are labeled at the top of FIG. 5 and the spectrum for BST64 is shown at the bottom of FIG. 5. The spectra of FIGS. 5–9 demonstrate that a cubic single-phase material was obtained for all of the preparations. Additional smaller peaks were found at some of the approximate 2θ values of 24°, 28°, 35°, 42°, 45°, 46°, 50°, 53.5°, 55°, and 61°. This occurred for samples containing Ge, (In,V), (Sb, V), (Y,V), (Ga,V), (Sc,V), (Al,V), (Al,Sb), (In,Ta), and (Al,Ta). These are consistent with (hkl) values (012), (112), (003), (213), (104), (313), (323), and (333), respectively, for a cubic superlattice with an effective lattice constant which is double that of the unit cell. The lattice constants were derived from the x-ray diffraction peaks using the method of Cullity. Goldschmidt's tolerance factor and the Clausius-Mossotti relationships can be used as a guide for appropriate substitutions and combinations thereof.

Figure 10:
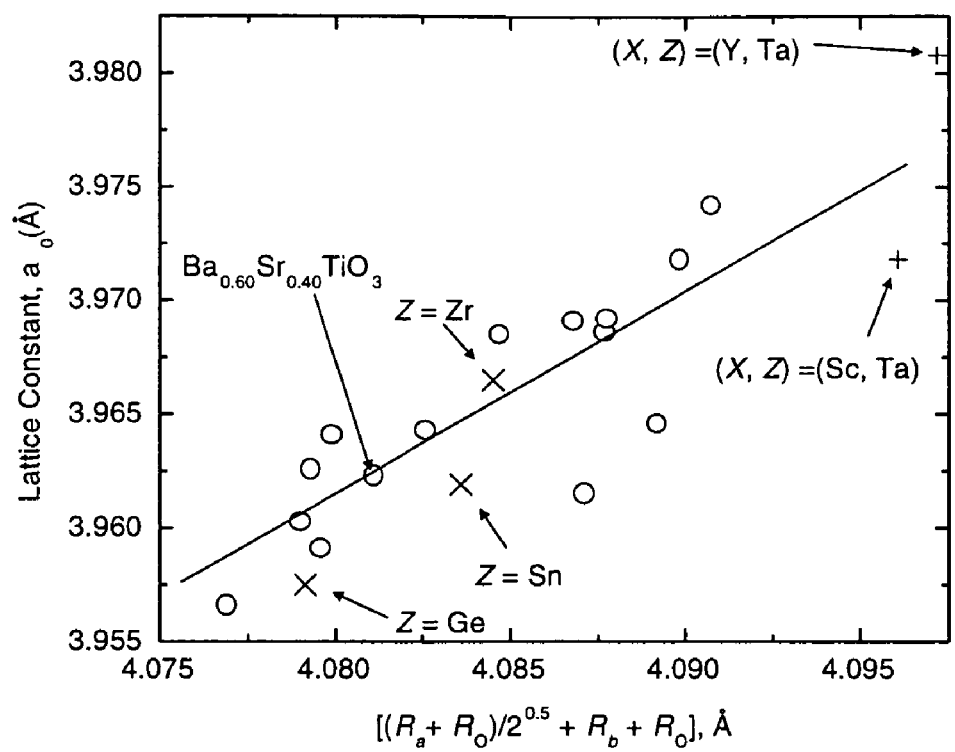
FIG. 10 is a graph of lattice constants, $a_0$, derived from experimental x-ray diffraction vs. lattice parameter, $a_G$, based on ionic radii of the A, B, and Oxygen (O) atoms in the unit cell, for a series of 3 FE/PE families of materials of the present invention. Undoped $Ba_{0.6}Sr_{0.4}TiO_3$ is shown for comparison.
Figure 11:
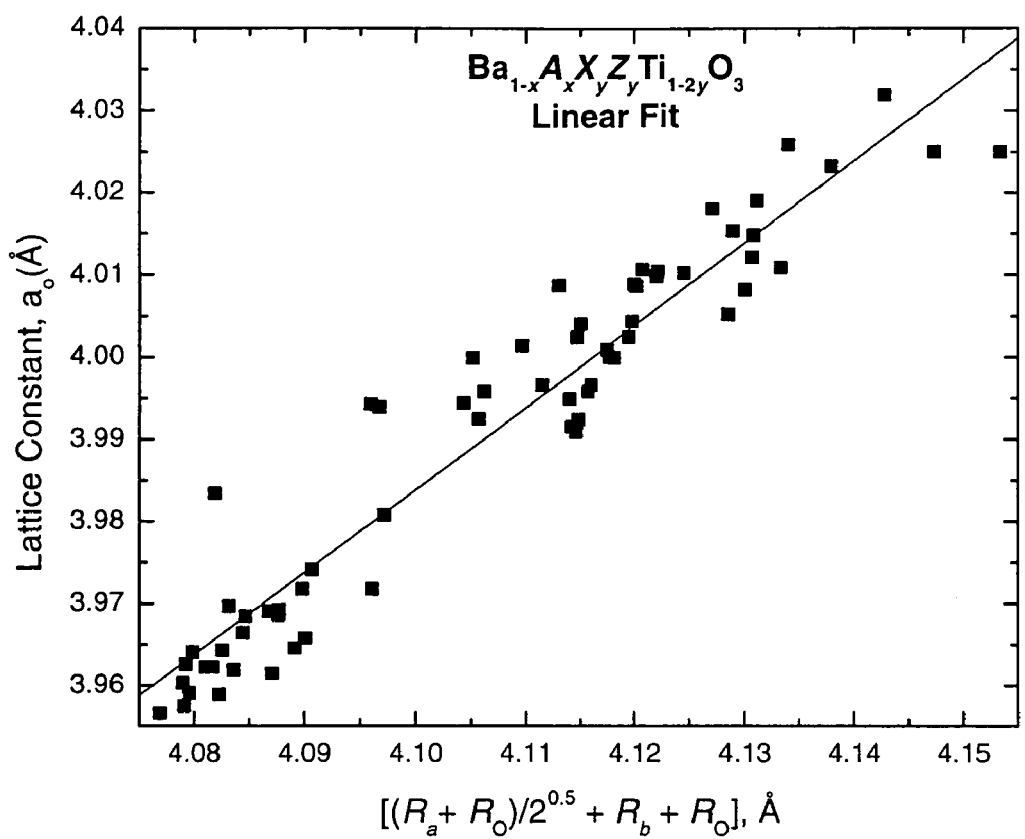
FIG. 11 is a graph of lattice constants, $a_0$, derived from experimental x-ray diffraction vs. lattice parameter, $a_G$, based on ionic radii of the A, B, and Oxygen (O) atoms in the unit cell, for a series of 3 FE/PE families of materials of the present invention $Ba_{1-(x+p)}Sr_xCa_pTi_{1-2y+\Delta}(Z_yZ'_y)O_3$ wherein x has values ranging from 0.01 to 0.15, p has values ranging from 0.05 to 0.10, y has values ranging from 0.1 to 0.15 and Z=Al, Ga, Sc, In, Y, Pr, Nd, Sm, Eu, Gd, Tb, Dy, Ho, Er, Tm, Yb, Lu, Zn, Mg, Ca and Z'=Sb, Ta, W, Mo, Nb versus an undoped BST (shown as $a_0$ in FIG. 10).
Figures 13A, 13B:
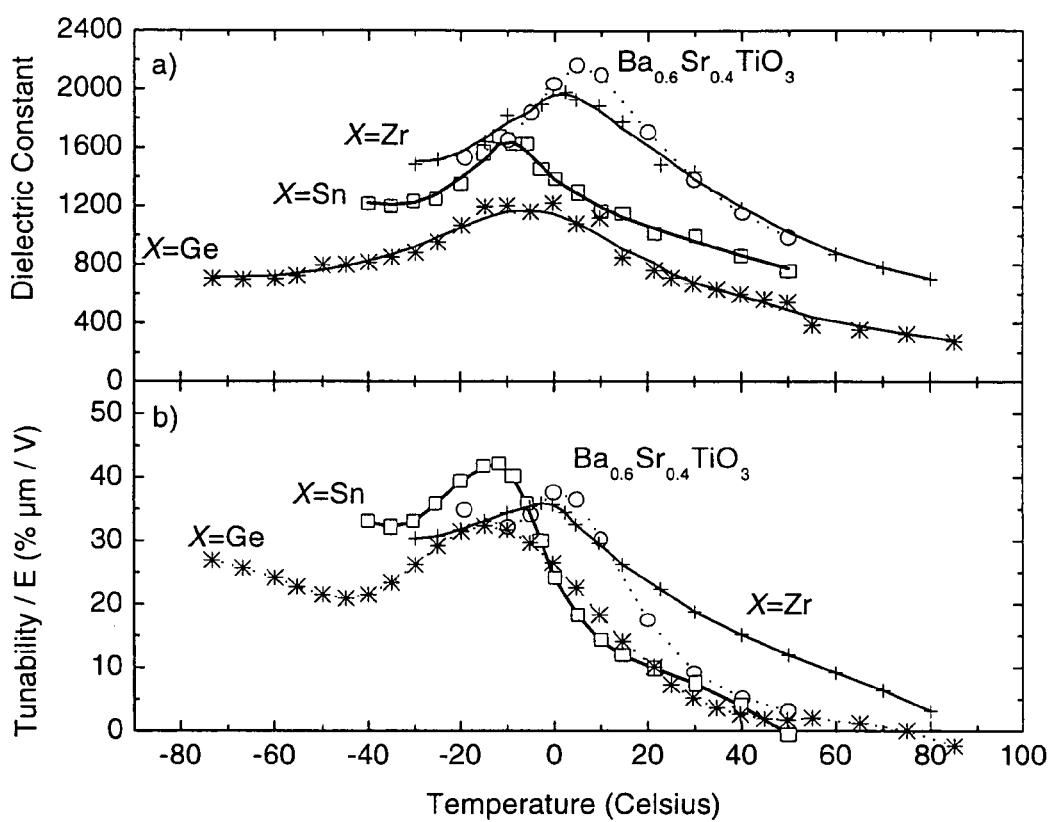
FIG. 13(a) is a graph of dielectric constant vs. temperature at 1 MHz for 3% substitutions of $X^{4+}$ with X=Sn, Ge, and Zr for 3% of Ti in the FE/PE material, that is, $Ba_{0.6}Sr_{0.4}X_{0.03}Ti_{0.97}O_3$, of the present invention.
FIG. 13(b) is a graph of percent tunability divided by electric field vs. temperature at 1 MHz for 3% substitutions of $X^{4+}$ with X=Sn, Ge, and Zr for 3% of Ti in the FE/PE material; that is, $Ba_{0.6}Sr_{0.4}X_{0.03}Ti_{0.97}O_3$, of the present invention.
Figure 15A:
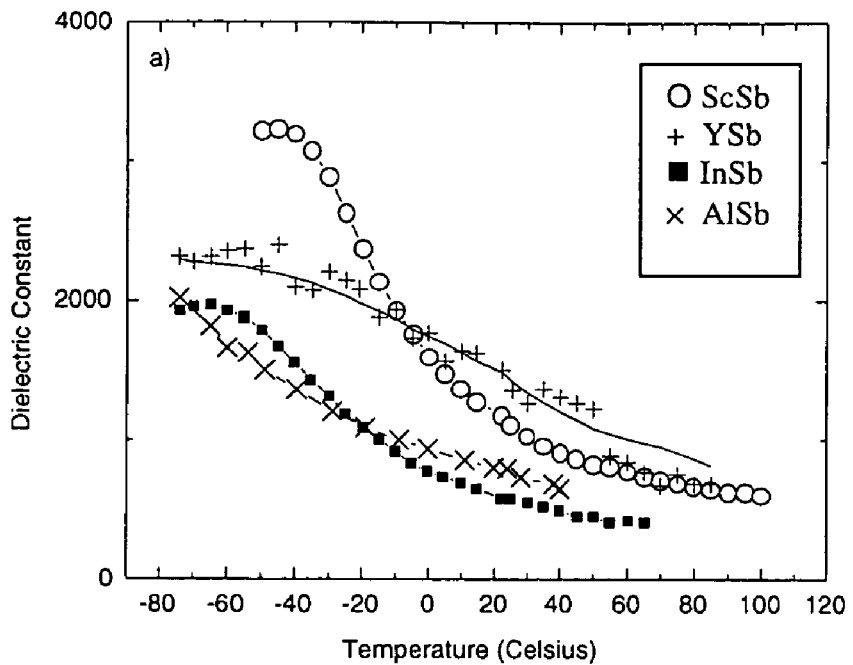
FIG. 15(a) is a graph of dielectric constant vs. temperature at 1 MHz for 3% substitutions of the charge compensating pair, (X,Sb), with X=Sc, Y, In, and Al for 6% of Ti in the FE/PE material, that is, $Ba_{0.6}Sr_{0.4}X_{0.03}Sb_{0.03}Ti_{0.94}O_3$ of the present invention.
Figure 15B:
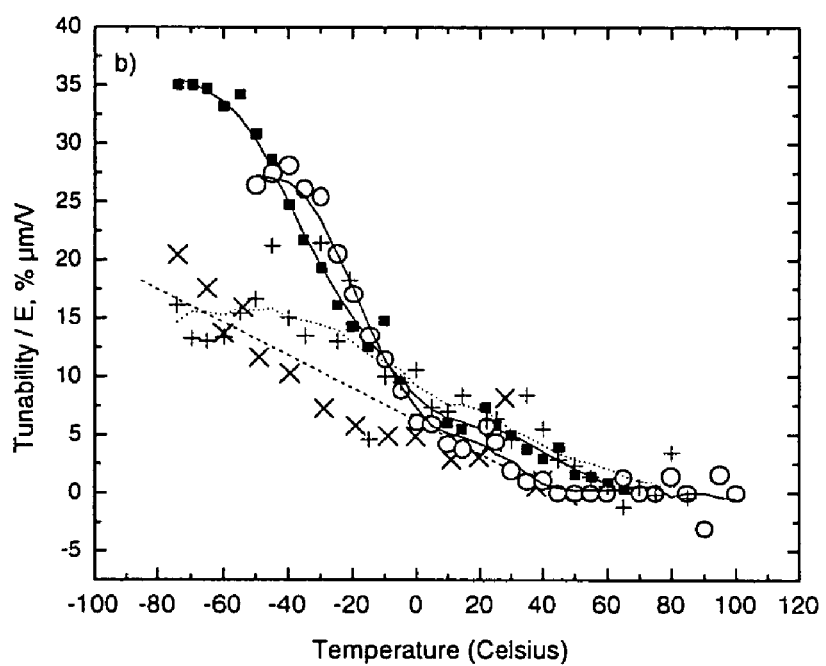
FIG. 15(b) is a graph of percent tunability divided by electric field vs. temperature at 1 MHz for 3% substitutions of the charge compensating pair, (X,Sb), with X=Sc, Y, In, and Al for 6% of Ti in the FE/PE material, that is, $Ba_{0.6}Sr_{0.4}X_{0.03}Sb_{0.03}Ti_{0.94}O_3$ of the present invention.

FIG. 10 herein is a plot of the experimental lattice constants, obtained from the x-ray data, versus a lattice parameter, $a_G$, where $a_G$ is represented by the following equation:

$$a_G = (R_a + R_o)/2^{1/2} + R_b + R_o \quad \text{(IV)}$$

which is derived from a hard-sphere model for the perovskite unit cell of Goldschmidt. $R_a$ is the radius of the A-site atom, $R_b$ is the radius of the B-site atom, and $R_o$ is the radius of the oxygen atom. To compute aG, ionic radii from *Acta Crystallogr. A*, Shannon, R.D. 32, 751(1971) were used, and $R_a$ and $R_b$ were weighted to account for the stoichiometric percentages of ions present in each site for the various compounds synthesized. The plotted line shown in FIG. 10 is the least squares linear fit of the data.

Capacitance and Microwave Cavity Measurements

After preparation and characterization of the samples shown in Table II, as shown in FIG. 12, and described above, measurements of properties relevant for evaluation of phase shifter, true time delay applications and other tunable RF, microwave, and millimeter wave device applications ($\in$, tunability, and loss tangent) were made, and values for each obtained, as follows:

A measurement of dielectric constant versus temperature and versus electric field was made for each of the samples. The electric field needed for such measurement was provided by application of a voltage from a Bertan 205B high voltage D.C. power supply across the capacitor-plate contacts. A Boonton 72BD capacitance meter, with 1 MHz sampling frequency and adjusted so that the measurement circuit was isolated from the power supply ground, was used to make capacitance measurements.

Temperature-dependent measurements were made in the range of $-75°$ C.$\leq$T$\leq 100°$ C. with temperature control within $\pm 0.1°$ C. provided by a Tenney Junior Environmental Chamber. Background capacitance effects versus temperature for each of the samples discussed above were estimated by measuring the capacitance of the empty test fixture (no sample mounted in it). This measured capacitance of the empty test fixture was then subtracted from the capacitance values measured for each of the samples studied.

A room-temperature measurement was made of the capacitance and loss tangent of each sample at 1 kHz using a BK 878 Universal LCR meter. Measurements of $\in$ and loss tangent at 20 GHz were performed using a microwave confocal resonator on a sample of $Ba_{0.6}Sr_{0.4}Y_{0.05}Ta_{0.05}Ti_{0.90}O_3$ whose thickness was 483 μm (less than the wavelength of radiation in the sample at the maximum-measured frequency of 30 GHz) and whose diameter exceeds the beam waist at the cavity center. Results were determined, according to methods described in *Proc. R. Soc. Lond.*, A.L. Cullin and P.K. Yu, 325, 493 (1971), and improvements in instrumentation by some of the present inventors, by comparing the frequency and the broadening of resonances for the sample in the cavity to those for the case in which the cavity is empty.

Results

Figures 17A, 17B:
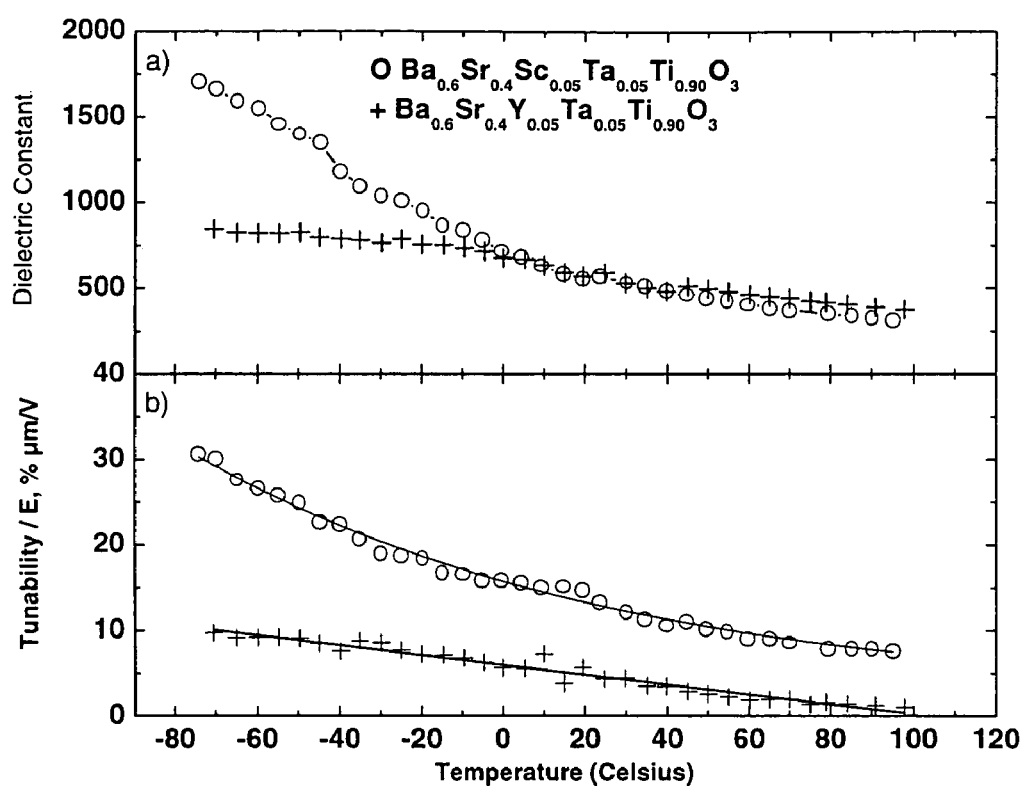
FIG. 17(a) is a graph of dielectric constant vs. temperature at 1 MHz for 5% substitutions of the charge compensating pairs, (Sc,Ta) and (Y,Ta), for 10% of Ti in the FE/PE material of the present invention.
FIG. 17(b) is a graph of percent tunability divided by electric field vs. temperature at 1 MHz for 5% substitutions of the charge compensating pairs, (Sc,Ta) and (Y,Ta), for 10% of Ti in the FE/PE material of the present invention.
Figure 18:
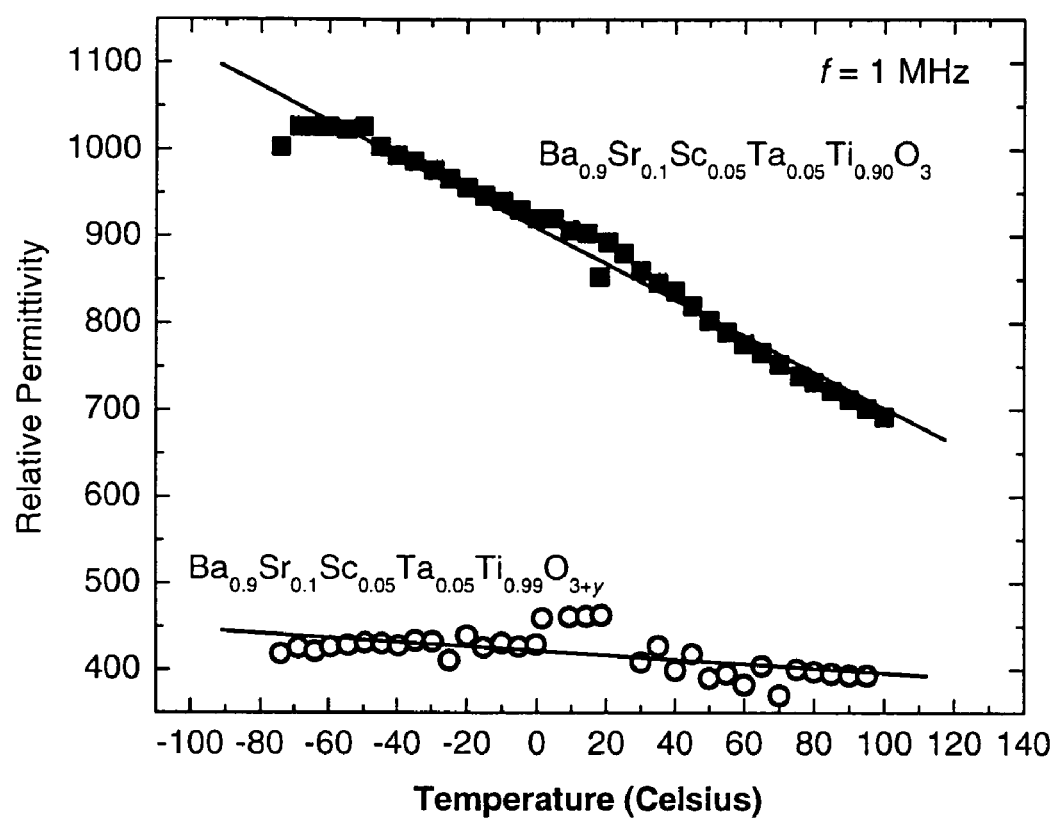
FIG. 18 is a graph of dielectric constant vs. temperature at 1 MHz for $Ba_{0.9}Sr_{0.1}Sc_{0.05}Ta_{0.05}Ti_{0.90}O_3$ and $Ba_{0.9}Sr_{0.1}Sc_{0.05}Ta_{0.05}Ti_{0.99}O_{3+\delta}$ (the same composition with 9% excess of Ti where $\delta$ represents excess oxygen for charge compensating the excess Ti $\Delta$ in the formula), as called for in the FE/PE material of the present invention.
Figure 19:
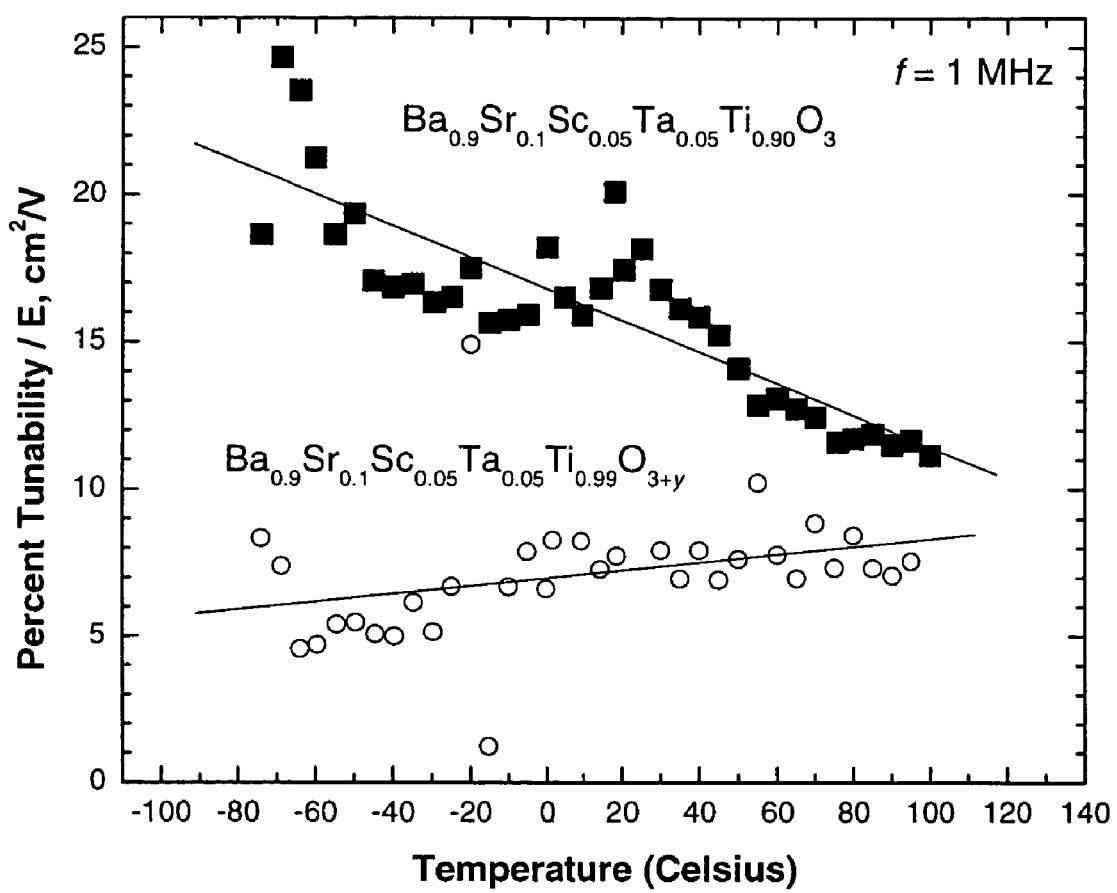
FIG. 19 is a graph of percent tunability divided by electric field vs. temperature at 1 MHz for $Ba_{0.9}Sr_{0.1}Sc_{0.05}Ta_{0.05}Ti_{0.9}O_3$ and $Ba_{0.9}Sr_{0.1}Sc_{0.05}Ta_{0.05}Ti_{0.99}O_{3+\delta}$ (the same composition with 9% excess of Ti where $\delta$ represents excess oxygen for charge compensating the excess Ti $\Delta$ in the formula),), as called for in the FE/PE material of the present invention.
Figure 20:
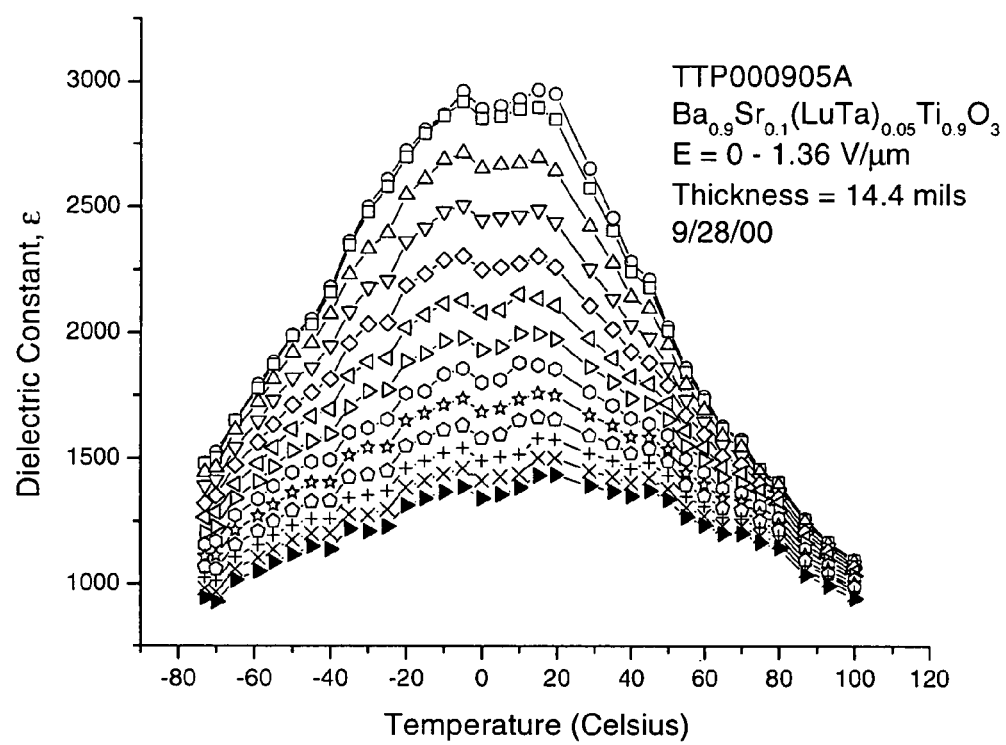
FIG. 20 is a graph of dielectric constant vs. temperature at 1 MHz for $Ba_{0.9}Sr_{0.1}Lu_{0.05}Ta_{0.05}Ti_{0.9}O_3$, a FE/PE material of the present invention. The plots are at different electric fields, E; the parameter varied is voltage in 50 volt increments from 0 to 600 volts.
Figure 21:
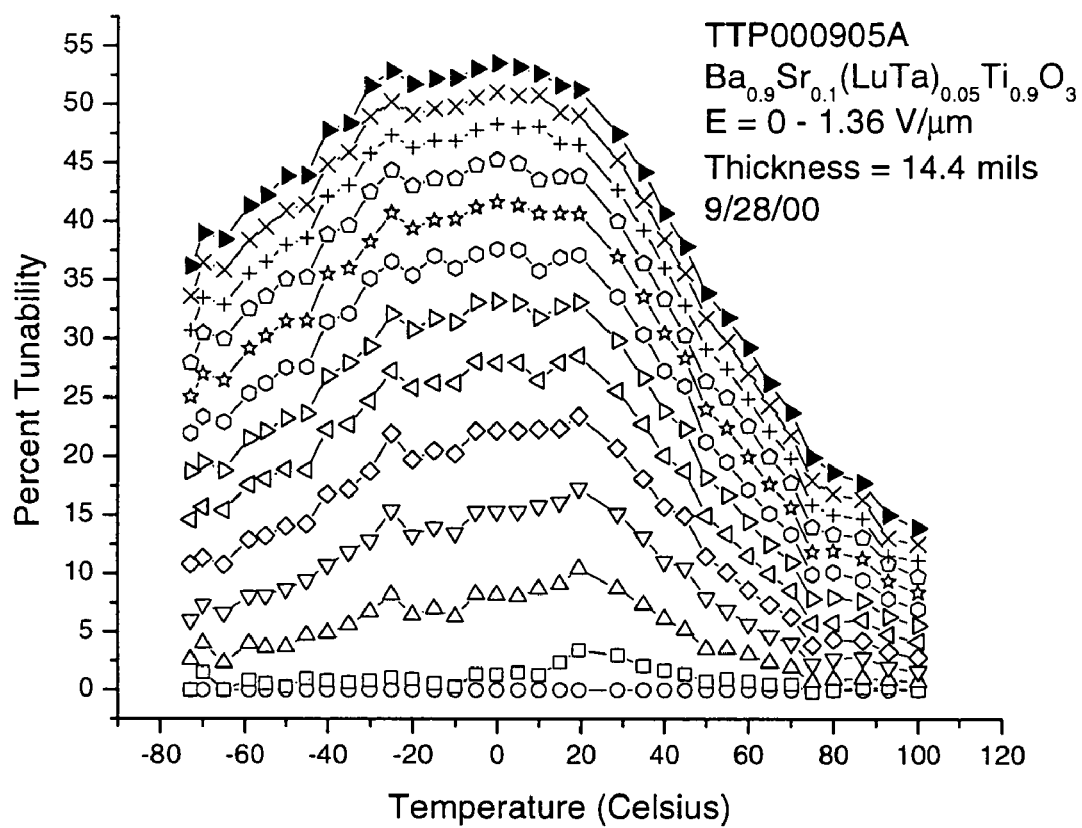
FIG. 21 is a graph of percent tunability vs. temperature at 1 MHz for $Ba_{0.9}Sr_{0.1}Lu_{0.05}Ta_{0.05}Ti_{0.9}O_3$, a FE/PE material of the present invention. The plots are at different electric fields, E; the parameter varied is voltage in 50 volt increments from 0 to 600 volts.
Figure 22:
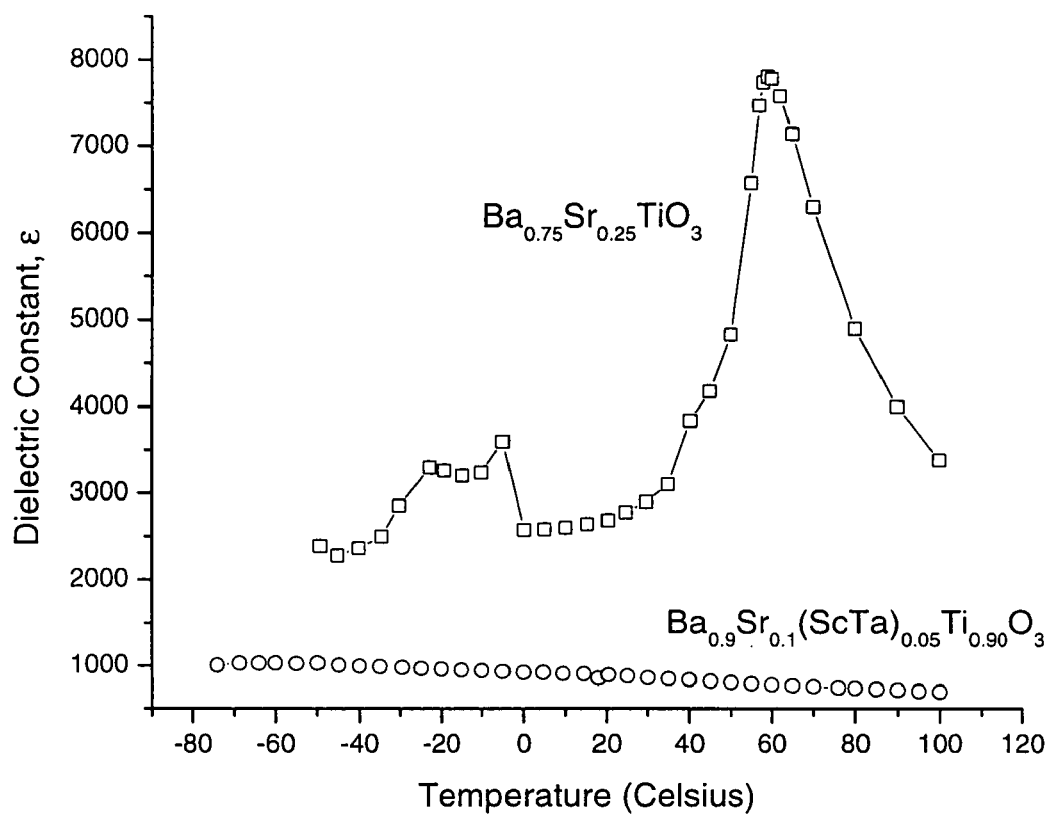
FIG. 22 is a graph of dielectric constant vs. temperature, at 1 MHz and electric field E=0, for $Ba_{0.75}Sr_{0.25}TiO_3$ and $Ba_{0.9}Sr_{0.1}Sc_{0.05}Ta_{0.05}Ti_{0.9}O_3$, with the latter being a FE/PE material of the present invention. The parameter is voltage in 50 volt increments from 0 to 600 volts. Other substitutions are possible and combinations thereof are also possible.
Figure 23:
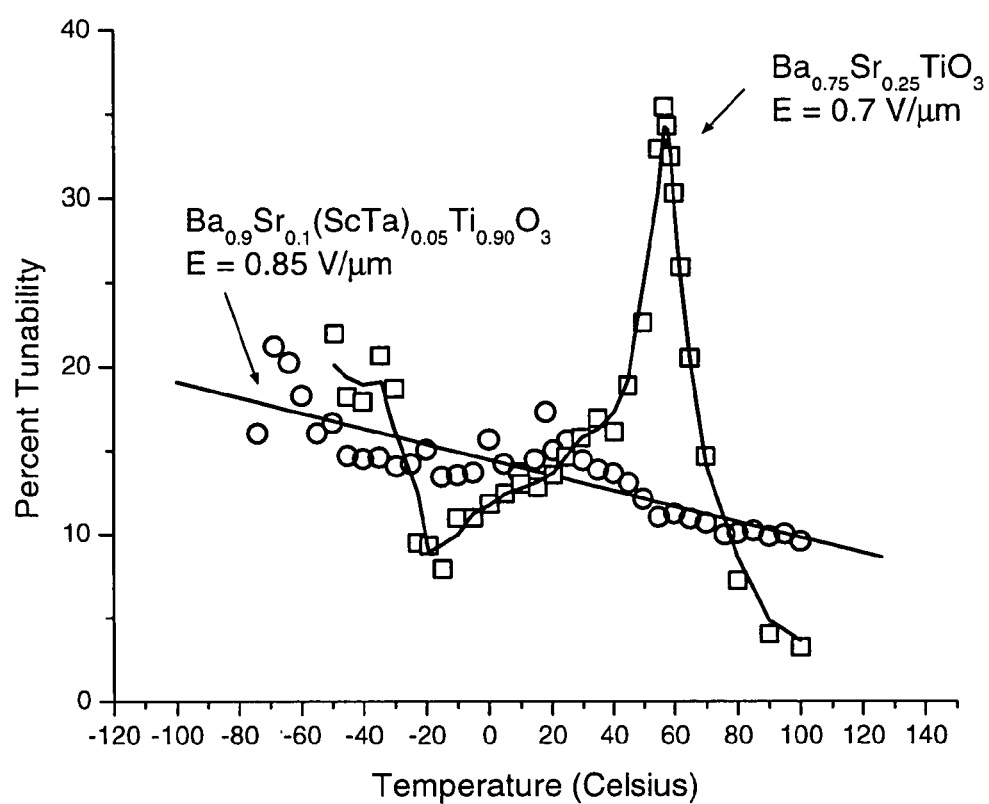
FIG. 23 is a graph of percent tunability vs. temperature at 1 MHz for $Ba_{0.75}Sr_{0.25}TiO_3$, and $Ba_{0.9}Sr_{0.1}Sc_{0.05}Ta_{0.05}Ti_{0.9}O_3$ the latter being a FE/PE material of the present invention. Other substitutions are possible and combinations thereof are also possible.

FIGS. 13(a)–16(a) herein show the zero-field dielectric constant, $\in(0)$, and in FIGS. 13(b)–16(b), the percent tunability normalized by dividing by the electric field, $\{100\Delta\in/\in(0)/E=\%\text{ Tun/E}\}$, for 3 and 6% substitutions into the Ti site. Since $\in(E)$ was linear, values of % Tun/E obtained here can be compared with those of other similarly linear materials. FIGS. 17(a) and 17(b) show $\in(0)$ and % Tun/E, respectively, versus temperature for the 5% substitutions of the charge compensating pairs (Sc,Ta) and (Y,Ta) for 10% of Ti($Ba_{0.6}Sr_{0.4}Sc_{0.05}Ta_{0.05}Ti_{0.90}O_3$ and $Ba_{0.6}Sr_{0.4}Y_{0.05}Ta_{0.05}Ti_{0.90}O_3$).

Table III, as shown in FIG. 24, shows the range of $\in(0)$, range of % Tun/E, and the FE transition temperature for zero field ($T_c^{E=0}$) for measurements on all the samples in the corresponding temperature ranges $T_{min} \leq T \leq T_{max}$. Together, these results show how the behavior of each material compares with that of others in the military specification temperature range of from $-50°$ C. to $100°$ C. For example, the $Sn^{4+}$ substitution for Ti alters $T_c$ very little. However, the FE/PE transition is broadened for Zr and Ge substitutions, which is preferred. The properties of ($Ba_{0.9}Sr_{0.1}Sc_{0.05}Ta_{0.05}Ti_{0.90}O_3$ and $Ba_{0.9}Sr_{0.1}Y_{0.05}Ta_{0.05}Ti_{0.90}O_3$) and other such materials, with Ba/Sr ratio 9/1, have an expanded range of operating temperatures compared with Ba/Sr ratio 6/4.

Maxima in $\in(0)$ are smaller but within a factor of two of that for BST64 and $T_c$ for these samples remains within a range of $-10°$ C.$\leq T_c^{E=0} \leq 2°$ C. compared to $5°$ C. for BST64. In contrast, for all of the (X, Z) binary substitutions except (Al, V) and (Y,V), there is considerably more broadening in $\in(0)$ and % Tun/E, and $T_c^{E=0}$ is shifted to $-40°$ C. or lower.

For $Ba_{0.6}Sr_{0.4}Sc_{0.05}Ta_{0.05}Ti_{0.90}O_3$ and $Ba_{0.6}Sr_{0.4}Y_{0.05}Ta_{0.05}Ti_{0.90}O_3$, FIG. 17(a) shows that the $T_c$ lies below the military specification temperature range and a low $\epsilon(0)$ has been obtained. With regards to $\epsilon(0)$ and % Tun/E, as shown in FIGS. 17(a) and 17(b), respectively, these factors are more temperature dependent for $Ba_{0.6}Sr_{0.4}Sc_{0.05}Ta_{0.05}Ti_{0.90}O_3$. In contrast, for $Ba_{0.6}Sr_{0.4}Y_{0.5}Ta_{0.05}Ti_{0.90}O_3$, $\in(0)$ and % Tun/E are more nearly temperature independent. As mentioned above, this is a desirable property for phase shifter device applications especially when tunability can be maintained.

The maximum and minimum of $\in(0)$ for the 5% substitution of the charge compensating pair (Y,Ta) for 10% of Ti in the material are about a factor of four larger than those of BSTMgO. Their tunabilities are comparable. The 5% substitution (Y,Ta) has a negative slope in $\in$ versus T over the entire military specification range, which is characteristic of paraelectric behavior. However, the BSTMgO sample has a ferroelectric transition temperature at $-30°$ C., below which the material is ferroelectric. Device performance is likely decreased below $T_c$.

The dilute charge substitutions discussed above, using acceptor-donor pairs substituting solely on the B-site (Ti-site) in $BaTiO_3$, have enabled significant lowering of the useful temperature regime of operation below that for $BaTiO_3$, and below the $T_c$ of BST64. Substitution of Sr for Ba in BST without any substitutions for Ti shifts the $T_c$ of $BaTiO_3$, but maintains a sharp transition and does not change the temperature range over which the material is useful. The charge compensating ion pair substitutions into the B-site lower the $T_c$ even further, and broaden the transition so that the material can be used in the paraelectric state, with reduced $\in$ over most or all of the military specification temperature range while maintaining tunability at 100° C. Such charge compensating ion pair substitutions can also be made into the A-site of the perovskite unit cell.

In addition to the materials with low $\in$ and temperature independent high tunability, there are materials for which high $\in$ and/or high tunability over at least part of the military specification range have been obtained, that may prove useful for other electronic applications. These include $Ba_{0.6}Sr_{0.4}Y_{0.03}V_{0.03}Ti_{0.94}O_3$ and $Ba_{0.6}Sr_{0.4}Al_{00.03}V_{0.03}Ti_{0.94}O_3$, which have maximum values of $\in(0)$ between 8,000 and 11,000 at 1 MHz and % Tun/E between 64%-$\mu m\text{-}V^{-1}$ and 70%-$\mu m\text{-}V^{-1}$, and the samples $Ba_{0.6}Sr_{0.4}X_{0.03}Z_{0.03}Ti_{0.94}O_3$ with (X, Z)=(Y, Ta), (In, Ta), (In, Sb), (Ga, Ta), (Ga, V), and (Sc, Sb), whose maxima in $\in(0)$ are an order of magnitude lower than those of $Ba_{0.6}Sr_{0.4}Y_{0.03}V_{0.03}Ti_{0.94}O_3$, and $Ba_{0.6}Sr_{0.4}Al_{0.03}V_{0.03}Ti_{0.94}O_3$ but which still exhibit maxima in % Tun/E which exceed 20%-$\mu m\text{-}V^{-1}$. The FE transition, $T_c^{E=0}$, for samples with (X, Z)=(Y, V), (Al, V), (In, Ta), (In, Sb), (Ga, V), and (Sc, Sb) are at −10° C., −12° C., −40° C., −60° C., −40° C., and −45° C., respectively. Consequently, their usable temperature ranges may be limited to that portion of the military specified temperature range above $T_c$ where the materials are paraelectric.

A figure of merit (FOM) was developed by the present inventors, to aid in further evaluating the materials. This FOM is defined as the absolute value of the ratio of the change in $\in$ due to electric field at a given temperature divided by the slope of $\in$ versus T at that temperature, and represented by the following equation:

$$FOM = \left| \left(\frac{\Delta \varepsilon}{\Delta E}\right)_T \div \left(\frac{\partial \varepsilon}{\partial T}\right)_T \right| \quad (V)$$

Ideally, $\Delta\in/\Delta E$ should be maximized, which is a measure of tunability, and $\partial\in/\partial T$ should be minimized, which measures the degree of dielectric constant instability with respect to temperature. The FOM results for the Reference Samples, $X^{4+}$ valence substitutions for Ti in the Reference Sample BST64, and for valency binary substitutions for Ti in Reference Sample BST64 are shown in Table V, as shown in FIG. 26. These were computed for 20° C. and for the minimum and maximum temperature bracketing the range of measurements in which the material was tunable and paraelectric. For materials which were paraelectric down to the lowest temperature measured, the minimum temperature is $T_{min}^P=T_{min}$, for materials whose $T_c$ fell within the mil spec range, the minimum temperature is $T_{min}^P=T_c^{E=0}$, and the maximum temperature is $T_{max}$ (see Tables III and IV, as shown in FIGS. 24 and 25, respectively).

An object of the present inventors was to find materials with the highest FOM, finite tunability, and the most constant $\in(0)$. It was found that materials with $T_{max}<100°$ C. cease to tune at $T_{max}$. Since the FOM is monotonic over this temperature range, the range of the FOM can be ascertained. This included the (X,V)- and XSb-substituted materials and all the 4+ substitutions except Zr. In contrast, the FOM at 100° C. for the (X,Ta)-substitutions was finite and was thus finite over the whole mil spec range. Of the 3% charge compensating pair (X,Ta) for 6% of Ti samples, the sample with the lowest range of dielectric constant that tunes over the military specification temperature range (the (Y,Ta) sample) does not have the highest FOM, and has an even lower range of dielectric constant at the 5% charge compensating pair for 10% Ti substitution level.

The room temperature $\in(0)$ and loss tangents at 1 kHz are given in Table VI, as shown in FIG. 27. A measurement on Rogers RT Duroid # D5880 is shown for comparison. The room-temperature $\in(0)$ at 1 MHz sampling frequency is shown for comparison, and a reference value for the high frequency dielectric material RT/Duroid D5880 was also measured. In general, the $\in(0)$ value corresponding to each sample was found to be qualitatively similar at both frequencies. This is consistent with frequency dependence previously measured in the paraelectric regime.

Analysis Using the Clausius-Mossotti Equation

Using ionic polarizability sums, the Clausius-Mossotti equation has been used successfully to obtain dielectric constant values that agree with experimental values for simple oxide dielectrics. However, accurate values for dielectric constants of perovskites in the paraelectric state have not been determined using this method. One of the weaknesses for application of the Clausius-Mossotti relation to perovskite materials is the fact that atomic polarizabilities in the perovskite environment have not been determined. It may be important to use a charge density more complex than that obtained using hard sphere approximations.

Figure 28:
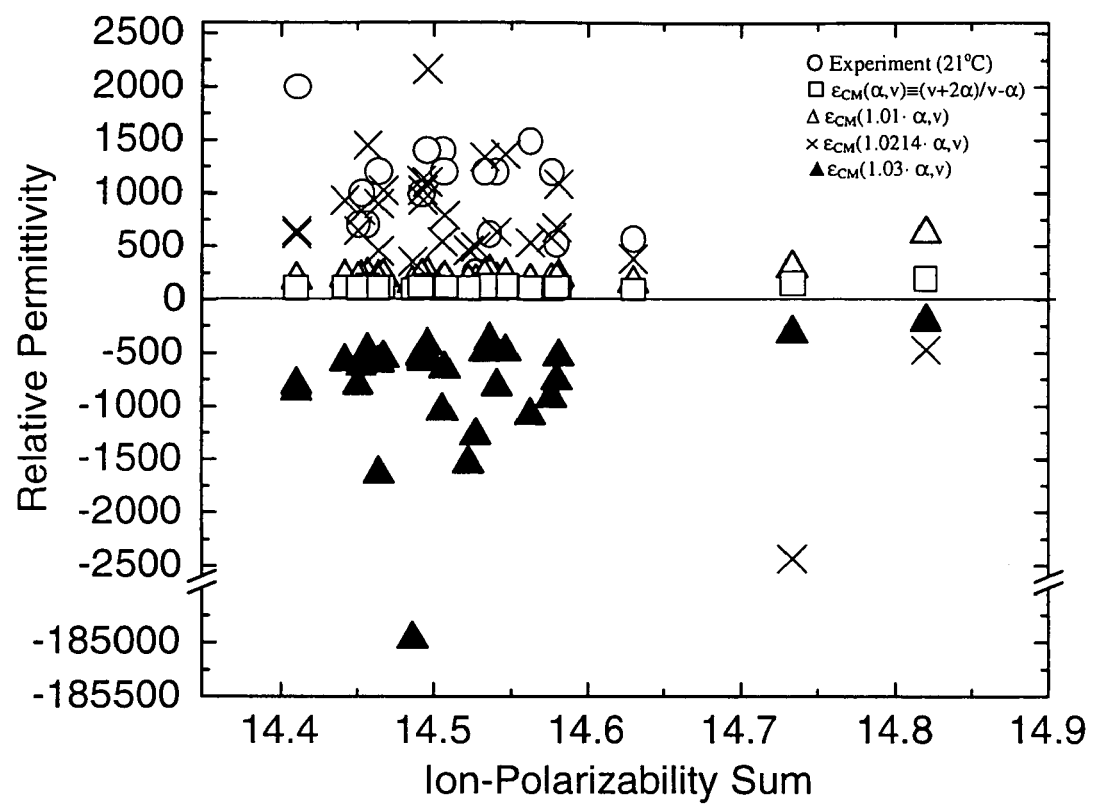
FIG. 28 is a graph of Clausius-Mossotti dielectric constants of the samples described in FIGS. 24, 26 and 27 above vs. the ion polarizability sums of each.

The equation also has a discontinuity at $\alpha=V=4\pi V/3$, where $\alpha$ is the polarizability sum and V is the molar volume. Small changes in $\alpha$ or V near this discontinuity can result in large changes in $\in$, and this condition applies for many perovskites. This is illustrated in FIG. 28 herein, which shows the Clausius-Mossotti dielectric constants of the materials (squares) plotted against the ion polarizability sums. The corresponding room temperature values of $\in(0)$, shown in FIGS. 13(a), 14(a), 15(a), 16(a) and 17(a) herein, are also plotted for comparison (circles). Polarizabilities, in J. Appl. Phys., R. D. Shannon, 73, 348 (1993), were assumed to be approximately valid and were used to compute the polarizabiliy sums. The lattice constants plotted in FIG. 10 herein were used to obtain the molar volumes. The computed results underestimate the measured $\in(0)$ values.

Three additional plots show the effect upon the results of the computation if the $\alpha$'s used to compute the abscissa are changed by 1–3% (open triangles, X's, and solid triangles for 1%, 2.14%, and 3% increases in $\alpha$, respectively). At $\in(\alpha)\to\in(1.0214\alpha)$, the least squares fit of the computed dielectric constants to the experimental $\in(0)$ values becomes minimized, while for $\in(\alpha)\to(1.03\alpha)$, the computed dielectric constants all become negative and the physical meaning is not clear.

Microwave Measurement Results

The $\in(0)$ value at room temperature for a 5% charge compensating pair (Y,Ta) sample with thickness 483 $\mu$m at 20 GHz, $\in=350$, is a factor of two lower than the values obtained at the lower frequencies of 1 kHz and 1 MHz. The corresponding value of Q for the cavity with the sample loaded at 20 GHz is 1466. The loss tangent can be roughly approximated in order to compare samples of equal thickness by $\tan\delta\approx Q^{-1}$. For a BSTMgO sample with the same thickness at 20 GHz and at room temperature, Q=2540 and loss tangent at 25 GHz is reported to be about 0.01 and thus is about a factor of two lower for BSTMgO compared with 5% charge compensating pair (Y,Ta) sample. However, tunability, which is a factor of 3 higher in (Y,Ta) than BSTMgO, as shown in FIG. 24, is far more important, as shown in FIG. 4, than loss tangent, and hence, the performance of the sample with 5% charge compensating pair (Y,Ta) substitution for 10% of Ti is expected to be better than BSTMgO over the entire specified military temperature range.

Thus, the present invention provides single-phase FE/PE materials having lowered, more constant dielectric constants (stable dielectric constants over a wide range of operating temperatures of −80° C. to 100° C.), reasonably low loss tangents (~$10^{-1}$), high tunability, and significant lowering of the Curie temperature, below the temperature range of operation for previous undoped perovskite structures. These FE/PE materials may be used in devices such as phase shifter devices (such as used in cell phones, antennas and the like), variable true time delay devices, steerable beams, tunable filters, impedance transformers, variable control oscillators, antennas, radios, filters, microwave variable capacitors, radar systems, electronic warfare sensors, resonators, microwave TE-FE voltage-controlled oscillators, and other RF tunable devices for synthesizers and systems incorporating all of the above. However, application should not be limited to the above, as the FE materials of the present invention may enhance the performance of various types of electrical devices and electro-optic devices not specifically listed above.

Enhanced tunability and lowered dielectric constant relatively independent of temperature is created by dilute charge-compensated substitutions solely in the Ti site of the perovskite structure claimed herein. Similar charge-compensating substitutions can also be made in the A-site. Importantly, the single-phase structure, especially cubic structures, provided herein allows for pulsed-laser-thin-film deposition, which enables production of very small, lightweight devices that are nonetheless extremely efficient and consume little power.

What is claimed is:

1. A ferroelectric/paraelectric material for use in tunable devices, having the following general formula I:

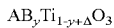

$$AB_y Ti_{1-y+\Delta} O_3 \quad\quad I$$

wherein A is one or more divalent ($2^+$) ions selected from the group consisting of Ba, Sr, Ca, and Pb; B is one or more trivalent ($3^+$) ions selected from the group consisting of Al, Ga, In, Sc, Pr, Nd, Sm, Eu, Gd, Tb, Dy, Ho, Er, Tm, Yb, Y, and Lu, paired with one or more pentavalent ($5^+$) ions selected from the group consisting of Sb, Ta, Nb and V; or B is one or more divalent ($2^+$) ions selected from the group consisting of Zn, Mg, and Ca, paired with one or more hexavalent ($6^+$) ions selected from the group consisting of W, and Mo; or B is a combination of said $3^+$ and $5^+$ ions paired with said $2^+$ and $6^+$ ions such that charge compensation is maintained; $0<y<1$, and $0<\Delta\leq 0.2$ and represents addition of excess titanium;
with the provisos that
1) A cannot be Ca by itself;
2) when A is Pb and B is Mg paid with W, y<0.30 or
3) when A is a combination of Pb and at least one of Ba, Sr and Ca, the amount of Pb is less than 80% of A; and
wherein said material is a pseudo ternary or higher system in the form of a single phase solid solution of a perovskite having a crystalline structure with charge balanced constituents.

2. The ferroelectric/paraelectric material of claim 1, wherein the perovskite structure has all A and B site in the cubic crystalline structure with the A site being 12 fold coordinated with oxygen atoms and the B site being 6 fold coordinated with oxygen atoms, and wherein:
the A site further comprises at least one member selected from the group consisting of one or more monovalent ($1^+$) ions selected from the group consisting of Li, Na, K, Rb and Cs, paired with one or more trivalent ($3^+$) ions selected from the group consisting of La, Pr, Nd, Sm, Eu, Gd, Tb, Dy, Ho, Er, Tm, Yb, Lu and Y, and combinations thereof, such that charge compensation is maintained in the A site; and
the B site comprises one or more members selected from the group consisting of one or more trivalent ($3^+$) ions selected from the group consisting of Al, Ga, In, Sc, Pr, Y, Nd, Sm, Eu, Gd, Tb, Dy, Ho, Er, Tm, Yb and Lu; paired with one or more pentavalent ($5^+$) ions selected from the group consisting of Sb, Ta, Nb, and V, and combinations thereof, such that charge compensation is maintained in the B-site.

3. The ferroelectric/paraelectric material of claim 1, wherein A further comprises one or more trivalent ($3^+$) ions selected from the group consisting of La, Pr, Nd, Sm, Eu, Gd, Tb, Dy, Ho, Er, Tm, Yb, Y, and Lu; and
the B site comprises one or more members selected from the group consisting of one or more divalent ($2^+$) ions selected from the group consisting of Zn, Mg, and Ca, paired with one or more hexavalent ($6^+$) ions selected from the group consisting of W, and Mo; or B comprises one or more members selected from the group consisting of one or more trivalent ($3^+$) ions selected from the group consisting of Al, Ga, In, Sc, Pr, Y, Nd, Sm, Eu, Gd, Tb, Dy, Ho, Er, Tm, Yb and Lu; paired with one or more pentavalent ($5^+$) ions selected from the group consisting of Sb, Ta, Nb, and V, and combinations thereof, such that charge compensation is maintained.

4. The ferroelectric/paraelectric material of claim 1, wherein B is one or more divalent ($2^+$) ions selected from the group consisting of Zn, Mg, and Ca, paired with one or more hexavalent ($6^+$) ions selected from the group consisting of W, and Mo, and further comprises at least one member selected from the group consisting of one or more tetravalent ($4^+$) ions selected from the group consisting or Ge, Sn, and Zr, such that charge compensation is maintained.

5. The ferroelectric/paraelectric material of claim 1, wherein B is one or more combinations of trivalent ($3^+$) ions selected from the group consisting of Al, Ga, In, Sc, Pr, Nd, Sm, Eu, Gd, Tb, Dy, Ho, Er, Tm, Yb, Y, and Lu, paired with one or more pentavalent ($5^+$) ions selected from the group consisting of Sb, Ta, Nb, and V, and further comprises at least one member selected from the group consisting of one or more tetravalent ($4^+$) ions selected from the group consisting of Ge, Sn, and Zr, such that charge compensation is maintained.

6. The ferroelectric/paraelectric material of claim 1, wherein B is one or more trivalent ($3^+$) ions selected from the group consisting of Al, Ga, In, Sc, Pr, Nd, Sm, Eu, Gd, Tb, Dy, Ho, Er, Tm, Yb, Y, and Lu, paired with one or more pentavalent ($5^+$) ions selected from the group consisting of Sb, Ta, Nb, and V; with one or more divalent ($2^+$) ions selected from the group consisting of Zn, Mg, and Ca; paired with one or more hexavalent ($6^+$) ions selected from the group consisting of W, and Mo, and further comprises
at least one member selected from the group consisting of one or more tetravalent ($4^+$) ions selected from the group consisting of Ge, Sn, and Zr; such that charge compensation is maintained.

7. The ferroelectric/paraelectric material of claim 1, wherein the perovskite structure has an A and B site in the cubic crystalline structure with the A sites being 12 fold coordinated with oxygen atoms and the B site being 6 fold coordinated with oxygen atoms, and wherein:

the A site further comprises at least one member selected from the group consisting of one or more monovalent ($1^+$) ions selected from the group consisting of Li, Na, K, Rb and Cs, paired with one or more trivalent ($3^+$) ions selected from the group consisting of La, Pr, Nd, Sm, Eu, Gd, Tb, Dy, Ho, Er, Tm, Yb, and Lu, Y, and combinations thereof, such that charge compensation is maintained in the A site;

the B site comprises one or more members selected from the group consisting of one or more divalent ($2^+$) ions selected from the group consisting of Zn, Mg, and Ca, paired with one or more hexavalent ($6^+$) ions selected from the group consisting of W, and Mo;

y is greater than 0 and less than 1; and $0<\Delta\leq 0.2$, such that charge compensation is maintained.

8. A ferroelectric/paraelectric material defined by general formula II:

$$(A_{1-x-z}Ba_xSr_z)B_yTi_{1-y+\Delta}O_3 \quad \text{II}$$

wherein said material has a perovskite structure having an A and B site in the cubic crystalline structure with the A sites being 12 fold coordinated with oxygen atoms and the B sites being 6 fold coordinated with oxygen atoms;

A comprises at least one member selected from the group consisting of one or more monovalent ($1^+$) ions selected from the group consisting of Li, Na, K, Rb and Cs, paired with one or more trivalent ($3^+$) ions selected from the group consisting of La, Pr, Nd, Sm, Eu, Gd, Tb, Dy, Ho, Er, Tm, Yb, Y, and Lu, and combinations thereof, such that charge compensation is maintained in the A site; and B comprises one or more members selected from the group consisting of one or more trivalent ($3^+$) ions selected from the group consisting of Al, Ga, In, Sc, Pr, Y, Nd, Sm, Eu, Gd, Tb, Dy, Ho, Er, Tm, Yb and Lu; paired with one or more pentavalent ($5^+$) ions selected from the group consisting of Sb, Ta, Nb, and V, and combinations thereof, or a combination of one or more trivalent ($3^+$) ions paired with one or more pentavalent ($5^+$) ions, or is a combination of divalent ($2^+$) ions paired with hexavalent ($6^+$) ions or is a combination of one or more trivalent ($3^+$) ions paired with one or more pentavalent ($5^+$) ions with a combination of one or more divalent ($2^+$) ions paired with hexavalent ($6^+$) ions; such that charge compensation is maintained in the B-site; wherein;

$0<y<1$;

$0<\Delta\leq 0.2$;

$0<x<1$;

$0<x+z<1$ such that charge compensation is maintained.

9. The ferroelectric/paraelectric material of claim 5, wherein the perovskite structure has an A and B site in the cubic crystalline structure with the A sites being 12 fold coordinated with oxygen atoms and the B sites being 6 fold coordinated with oxygen atoms, wherein:

B is a combination of trivalent ($3^+$) Al ions paired with pentavalent ($5^+$) Ta ions, represented by $(Al_yTa_y)$, such that charge compensation is maintained.

10. The ferroelectric/paraelectric material of claim 9, wherein y is about 0.05.

11. The ferroelectric/paraelectric material of claim 5, wherein B is a combination or trivalent ($3^+$) Y ions paired with pentavalent ($5^+$) Ta ions represented by $(Y_y Ta_y)$; such that charge compensation is maintained.

12. The ferroelectric/paraelectric material of claim 11, wherein y is 0.05.

13. A ferroelectric/paraelectric material for use in tunable devices having the following general formula III:

$$Ba_{1-(x+p+z)}Sr_zPb_pCa_xTi_{1-2y+\Delta}(B_{2y})O_3 \quad \text{II}$$

wherein $0<p<0.80$, $0<x<1$, $0<z<1$, $0<(x+p+z)<1$, $0<y<0.5$, $0<\Delta<0.2$ (representing addition of excess Ti), and $B_{2y}$ has charge quantities with a total sum of $8^+$, and wherein $x+p+z+y+\Delta>0$, B comprises one or more members selected from the group consisting of one or more trivalent ($3^+$) ions selected from the group consisting of Al, Ga, In, Sc, Pr, Y, Nd, Sm, Eu, Gd, Tb, Dy, Ho, Er, Tm, Yb and Lu, paired with one or more pentavalent ($5^+$) ions selected from the group consisting of Sb, Ta, Nb, and V, and combinations thereof, or B is one or more divalent ($2^+$) ions selected from the group consisting of Zn, Mg, and Ca, paired with one or more hexavalent ($6^+$) ions selected from the group consisting of W, and Mo, or B is a combination of said $3^+$ and $5^+$ ions paired with said $2^+$ and $6^+$ ions such that charge compensation is maintained in the B-site; and said material is in the form of a single phase solid solution of a perovskite having a crystalline structure and charge balanced constituents.

14. The ferroelectric/paraelectric material of claim 13, wherein B further comprises combinations of trivalent ion element pairs with individual pentavalent ion elements, and combinations of divalent ion element pairs with individual or combinations of hexavalent ion elements such that charge compensation is maintained in the B-site.

15. The ferroelectric/paraelectric material of claim 13, wherein

B comprises one or more members selected from the group consisting of one or more trivalent ($3^+$) ions selected from the group consisting of Al, Ga, In, Sc, Pr, Y, Nd, Sm, Eu, Gd, Tm, Dy, Ho, Er, Tm, Yb and Lu, paired with one or more pentavalent ($5^+$) ions selected from the group consisting or Sb, Ta, Nb, and V, and combinations thereof, such that charge compensation is maintained in the B-site; and further comprises divalent ion element pairs with hexavalent ion element pairs, combinations of trivalent ion element pairs with individual pentavalent ion elements and combinations of divalent ion element pairs with individual or combinations of hexavalent ion elements.

16. The ferroelectric/paraelectric material of claim 13, wherein x=0.4, B comprises a trivalent ion paired with a pentavalent ion, B, $0<y<0.5$ and $0<p<0.80$.

17. The ferroelectric/paraelectric material of claim 13, wherein charge-compensated substitutions are made for Ti sites in the material.

18. The ferroelectric/paraelectric material of claim 16, wherein charge-compensated substitutions are made for Ti sites in the material.

19. The ferroelectric/paraelectric material or claim 13, wherein charge-compensated substituents ror Ti sites comprise Ge, Sn, Zr, Al, Ga, In, Sb, Sc, Ta, V, Y, Pr, Nd, Sm, Eu, Gd, Tb, Dy, Ho, Er, Tm, Yb, Lu, Nb, W, Mo, Zn, Mg, Ca, and combinations thereof.

20. The ferroelectric/paraelectric material of claim 18, wherein charge-compensated substituents for Ti comprise Ge, Sn, Zr, Al, Ga, Tn, Sb, Sc, Ta, V, Y, Pr, Nd, Sm, Eu, Gd, Tb, Dy, Ho, Er, Tm, Yb, Lu, Nb, W, Mo, Zn, Mg, Ca, and combinations thereof.

21. The ferroelectric/paraelectric material of claim 13, wherein said material has a one-to-one substitution of Sn, Ge, or Zr for Ti therein, or combinations of such substitutions for Ti.

22. The ferroelectric/paraelectric material of claim 17, wherein said material has a one-to-one substitution of Sn, Ge, or Zr for Ti therein, or combinations of such substitutions for Ti.

23. The ferroelectric/paraelectric material of claim 13, wherein B is a trivalent ion paired with a pentavalent ion or a divalent ion paired with a hexavalent ion, $x=0.1$, $0<y<0.5$, and $0<p<0.80$.

24. The ferroelectric/paraelectric material of claim 14, wherein charge-compensated substituents for Ti comprise Ge, Sn, Zr, Al, Ga, In, Sb, Sc, Ta, V, Y, Pr, Nd, Sm, Eu, Gd, Tb, Dy, Ho, Er, Tm, Yb, Lu, Nb, W, Mo, Zn, Mg, Ca, and combinations thereof.

25. The ferroelectric/paraelectric material of claim 15, wherein charge-compensated substituents for Ti comprise Ge, Sn, Zr, Al, Ga, In, Sb, Sc, Ta, V, Y, Pr, Nd, Sm, Eu, Gd, Tb, Dy, Ho, Er, Tm., Yb, Lu, Nb, W, Mo, Zn, Mg, Ca, and combinations thereof.

26. The ferroelectric/paraelectric material of claim 13, wherein B is a trivalent ion paired with a pentavalent ion or a divalent ion paired with a hexavalent ion, $x=0.2$, $0<y<0.5$, and $0<p<0.80$.

27. The ferroelectric/paraelectric material of claim 13, wherein B is a trivalent ion paired with a pentavalent ion or a divalent ion paired with a hexavalent ion, $x=0.3$, $0<y<0.5$ and $0<p<0.70$.

28. An electric field tunable ferroelectric/paraelectric material comprising $Ba_{0.6}Sr_{0.4}Y_{0.05}Ti_{0.05}Ti_{0.90}O_3$.

29. An electric field tunable ferroelectric/paraelectric material comprising $Ba_{0.9}Sr_{0.1}Sc_{0.1}Ta_{0.05}Ti_{0.9}O_3$.

30. An electric field tunable ferroelectric/paraelectric material comprising $Ba_{0.9}Sr_{0.1}Sc_{0.05}Ta_{0.05}Ti_{0.99}O_3$.

31. A patch antenna comprising the ferroelectric/paraelectric material of claim 13.

32. A phased array antenna comprising the ferroelectric/paraelectric material of claim 13.

33. A true time delay device comprising the ferroelectric/paraelectric material of claim 13.

34. A tunable filter comprising the ferroelectric/paraelectric material of claim 13.

35. An impedance transformer comprising the ferroelectric/paraelectric material of claim 13.

36. An oscillator comprising the ferroelectric/paraelectric material of claim 13.

37. A phase shifter device comprising the ferroelectric/paraelectric material of claim 13.

38. The ferroelectric/paraelectric material of claim 13, wherein said material has a dielectric constant ($\in$) of greater than 1 and less than or equal to 1000.000.

39. The ferroelectric/paraelectric material of claim 16, wherein said material has a dielectric constant of greater than 1 and less than or equal to 1,000,000.

40. The ferroelectric/paraelectric material or claim 13, wherein said material has a tunability greater than 1% but less than 100% at 1 V/μm.

41. The ferroelectric/paraelectric material of claim 16, wherein said material has a tunability greater than 1% but less than 100% at 1 V μm.

42. The ferroelectric/paraelectric material of claim 13, wherein said material has a temperature operating range of −75° C. to 100° C.

43. The ferroelectric/paraelectric material of claim 16, wherein said ferroelectric/paraelectric material has a temperature operating range of −75° C. to 100° C.

44. The ferroelectric/paraelectric material of claim 13, wherein said material has an Sr/Ba ratio of 1/9.

45. The ferroelectric/paraelectric material of claim 16, wherein said material has an Sr/Ba ratio of 1/9.

46. An electric field tunable ferroelectric/paraelectric material comprising $Ba_{0.9}Sr_{0.1}X_{0.05}Z_{0.05}Ti_{0.09}O_3$, wherein X is one or more members selected from the group consisting of Sc, Ga, Al, In, Y, Lu, Pr, Nd, Sm, Eu, Gd, Tb, Dy, Ho, Er, Tm, or Yb, and combinations thereof, and Z is one or more members of the group consisting of Ta, V, Nb, and Sb.

47. An electric field tunable FE/PE material comprising: $Ba_{0.09}Sr_{0.1}X_{0.03}Z_{0.03}Ti_{0.94}O_3$, wherein (X and Z) are one or more members selected from the group consisting of (Y,Ta), (In,Ta), (In,Sb), (Ga,Ta), (Ga,V), (Ga,Sb), (AJ,Ta), (Al,Sb), (Sc,Ta) and (Sc,Sb); and combinations thereof.

48. An electric field tunable FE/PE material comprising $Ba_{0.8}Sr_{0.2}X_{0.05}Ti_{0.9}O_3$ wherein (X,Z) is one or more members selected from the group consisting of (Y,Ta), (In,Ta), (In,Sb), (Ga,Ta), (Ga,V), (Ga,Sb), (Al,Sb), and (Al,Ta).

49. An electric field tunable FE/PE material comprising $Ba_{0.8}Sr_{0.2}X_{0.1}Z_{0.1}Ti_{0.8}O_3$, wherein (X,Z) is one or more members selected from the group consisting of (Y,Ta), (In,Ta), (In,Sb), (Ga,Ta), (Ga,V), (Ga,Sb) (Al,Sb), and (Al, Ta).

50. An electric field tunable FE/PE material comprising: $Ba_{0.7}Sr_{0.3}X_{0.05}Z_{0.05}Ti_{0.9}O_3$, wherein (X,Z) is one or more members selected from the group consisting of (Y,Ta), (In,Ta), (In,Sb), (Ga,Ta), (Ga,V), (Ga,Sb), (Al,Sb), and (Al,Ta).

51. An electric field tunable FE/PE material comprising:
$Ba_{0.7}Sr_{0.3}X_{0.1}Z_{0.1}Ti_{0.8}O_3$, wherein (X,Z) is one or more members selected from the group consisting of (Y,Ta), (In,Ta), (In,Sb), (Ga,Ta), (Ga,V), (Ca,Sb), (Al,Sb), and (Al,Ta).

52. An electric field tunable ferroelectric/paraelectric material comprising:
$BaX_{0.05}Z_{0.05}Ti_{0.90}O_3$, wherein (X,Z) is one or more members selected from the group consisting of (Mg, W), (Mg, Mo), (Ca, Mo) and (Sc, Sb).

53. An electric field tunable ferroelectric/paraelectric material comprising:
$BaX_{0.1}Z_{0.1}Ti_{0.8}O_3$, wherein (X,Z) is one or more members selected from the group consisting of (Sc,Sb) and (Mg,Mo).

54. An electric field tunable ferroelectric/paraelectric material comprising:
$Ba_{0.8}Ca_{0.2}X_{0.05}Z_{0.05}Ti_{0.9}O_3$, wherein (X,Z) is one or more members selected from the group consisting of (Ga,Sb), (Ga,Ta), (Sc,Sb), (Sc,Ta), (Tn,Sb), and (In,Ta).

55. An electric field tunable ferroelectric/paraelectric material comprising:
$Ba_{0.8}Ca_{0.2}X_{0.1}Z_{0.1}Ti_{0.8}O_3$, wherein (X,Z) is one or more members selected from the group consisting of (Ga,Sb), (Ga,Ta), (Sc,Sb), (Sc,Ta), (In,Sb), and (In,Ta).

56. An electric field tunable ferroelectric/paraelectric material comprising:
$BaIn_{0.067}W_{0.033}Ti_{0.9}O_3$ and $Ba_{0.90}Ca_{0.10}In_{0.067}W_{0.033}Ti_{0.9}O_3$.

57. An electric field tunable ferroelectric/paraelectric material comprising:
$Ba_{0.8}Ca_{0.1}Sr_{0.1}X_{0.05}Z_{0.05}Ti_{0.09}O_3$, wherein (X,Z) is one or more members selected from the group consisting of (Ca, Mo) and (Ca,W).

58. An electric field tunable ferroelectric/paraelectric material comprising:
$Ba_{0.8}Ca_{0.1}Sr_{0.1}X_{0.1}Z_{0.1}Ti_{0.8}O_3$, wherein (X,Z) is one or more members selected from the group consisting of (Ca, Mo) and (Ca,W).

59. An electric field tunable ferroelectric/paraelectric material comprising:
$Ba_{0.9}Sr_{0.1}Sc_{0.05}Ta_{0.05}Ti_{0.9+\Delta}O_3$, wherein $\Delta=0.01$, 0.03, 0.05, 0.07, or 0.09.

60. The ferroelectric/paraelectric material of claim 46, wherein the material has a tunability grater than 1% but less than 100% at 1 V/μm.

61. The ferroelectric/paraelectric material of claim 47, wherein the material has tunability greater than 1% but less than 100% at 1 V/μm.

62. The ferroelectric/paraelectric material of claim 46, wherein said material has a dielectric constant of between 1 and 20,000 at 1 MHz and a tunability greater than 1% but less than 100% at 1 V/μm.

63. The ferroelectric/paraelectric material of claim 47, wherein said material has a dielectric constant of between 1 and 20,000 at 1 MHz and a tunability greater than 1% but less than 100% at 1 V/μm.

64. A ferroelectric/paraelectric material comprising $Ba_{0.9}Sr_{0.1}X_{0.05}Z_{0.05}Ti_{0.90}O_3$, wherein X is one or more members selected from the group consisting of Y and Lu, Z=Ta, and said material has a dielectric constant of between 1 and 20,000 at 1 MHz and a tunability greater than 1% but less than 100% at 1 V/μm.

65. A ferroelectric/paraelectric material comprising:
$Ba_{0.9}Sr_{0.1}X_{0.03}Z_{0.03}Ti_{0.94}O_3$, wherein (X,Z) is one or more members selected from the group consisting of (Y,Ta), (Tn,Ta), (In,Sb), (Ga,Ta), (Ga,V), and (Sc,Sb), material having a dielectric constant of between 1 and 20,000 at 1 MHz and a tunability greater than 1% but less than 100% at 1 V/μm.

66. A ferroelectric/paraelectric material wherein said material is a pseudo ternary or higher system in the form or a single phase solid solution of a perovskite having a crystalline structure with charge balanced constituents;
wherein the perovskite structure has an A and B site in the cubic crystalline structure with the A site being 12 fold coordinated with oxygen atoms and the B site being 6 fold coordinated with oxygen atoms for use in tunable devices,
said material having the following general formula $Ba_{1-A2a-A2b-A2c-A1a-A1b-A1c-A1d-A1e-A1d-A1e-A3a-A3b-A3c-A3d-A3e-A3f-A3g-A3h-A3i-A3j-A3k-A3l-A3m}$ $Ca_{A2a}Pb_{A2b}Sr_{A2c}Li_{A1a}Na_{A1b}K_{A1c}Rb_{A1d}CS_{A1e}Dy_{A3a}Eu_{A3b}Er_{A3c}Gd_{A3d}Ho_{A3e}La_{A3f}Nd_{A3g}Pr_{A3h}Sm_{A3i}Tb_{A3j}Tm_{A3k}Yb_{a3l}Y_{A3m}$ $Zn_{B2b}Ca_{B2c}Dy_{B3b}Eu_{B3c}Er_{B3d}Gd_{B3j}Ho_{B3g}Lu_{B3h}Nd_{B3i}Pr_{B3j}Sc_{B3k}Sm_{B3l}Y_{B3m}Yb_{B3n}NB_{B5a}Sb_{B5b}Ta_{B5c}V_{B5d}W_{B6a}Mo_{B6b}$ $Ti_{1-B2a-B2b-B2c-B3b-B3c-B3d-B3f-B3g-B3h-B3i-B3j-B3k-B3l-B3m-B3n-B5a-B5b-B6c-B5c-B5d-B6a-B6b-+\Delta}O_3$ wherein each three subscript index represents the molar level of the specific element into the specific A or B site that is represented as A or B in the first index and further being substituted in the specified ionic state +1, +2, +3, +4, +5, +6 as represented using the second index, and the third index is used to add further specificity such that each substituent element in each state has its own particular designation such that where each substituent is placed in the perovskite structure is clearly indicated;

wherein $\Delta$ represents excess Ti and $0 \leq \Delta \leq 0.2$; and wherein the subscripts have the ranges $0 \leq A1a \leq 0.5$, $0 \leq A1b \leq 0.5$, $0 \leq A1c \leq 0.5$, $0A1d \leq 0.5$, $0 \leq A1e \leq 0.5$ with $0 \leq (A1a+A1b+A1c+A1d+A1e) \leq 0.5$;

$0 \leq A2a \leq 1$, $0 \leq A2b < 0.8$, $0 \leq A2c \leq 1$ with $0 \leq (A2a+A2b+A2c) \leq 1.0$;

$0 \leq A3a \leq 0.5$, $0 \leq A3b \leq 0.5$, $0 \leq A3c \leq 0.5$, $0 \leq A3d \leq 0.5$, $0 \leq A3e \leq 0.5$, $0 \leq A3f \leq 0.5$, $0 \leq A3g \leq 0.5$, $0 \leq A3h \leq 0.5$, $0 \leq A3i \leq 0.5$, $0 \leq A3j \leq 0.5$, $0 \leq A3k \leq 0.5$, $0 \leq A3l \leq 0.5$, $0 \leq A3m \leq 0.5$ with $0 \leq (A3a+A3b+A3c+A3d+A3e+A3f+A3g+A3h+A3i+A3j+A3k+A3l+A3m) \leq 0.5$; and $(A1a+A1b+A1c+A1d+A1e)=(A3a+A3b+A3c+A3d+A3c+A3f+A3g+A3h+A3i+A3j+A3k+A3l+A3m)$ (dipole-like pairs in A-site) with $0 \leq (A1a+A1b+A1c+A1d+A1c+A2a+A2b+A2c+A3a+A3b+A3c+A3d+A3e+A3f+A3g+A3h+A3i+A3j+A3k+A3l+A3m) \leq$ (full range of A-site dipole substitutions);

$0 \leq B2a \leq 0.5$, $0 \leq B2b \leq 0.5$, $0 \leq B2c \leq 0.5$ with $0 \leq (B2a+B2b+B2c) \leq 0.5$;

$0 \leq B3b \leq 0.5$, $0 \leq B3c \leq 0.5$. $0 \leq B3d \leq 0.5$, $0 \leq B3f \leq 0.5$, $0B3g \leq 0.5$, $0B3h \leq 0.5$, $0 \leq B3i \leq 0.5$, $0 \leq B3j \leq 0.5$, $0 \leq B3k \leq 0.5$, $0 \leq B3l \leq 0.5$, $0 \leq B3m \leq 0.5$, $0 \leq B3n \leq 0.5$ with $0 \leq B3a+B3b+B3c+B3d+B3c+B3f+B3g+B3h+B3i+B3j+B3k+B3l+B3m+B3n) \leq 0.5$;

$0 \leq B5a \leq 0.5$, $0 \leq B5b \leq 0.5$, $0 \leq B5c \leq 0.5$, $0 \leq B5d \leq 0.5$ with $0 \leq (B5a+B5b+B5c) \leq 0.5$;

$0 \leq B6a \leq 0.5$, $0B6b \leq 0.5$ with $0 \leq (B6a+B6b) \leq 0.5$; and $(B3b+B3c+B3d+B3f+B3g+B3h+B3i+B3j+B3k+B3l+B3m+B3n)=(B5a+B5b+B5c+B5d)$ (dipole-like of $(3^+,5^+)$ in B-site) and $(B2a+B2b+B2c)=(B6a+B6b)$ (dipole-like pairs of $(2^+,6^+)$ in B-site) and $0 \leq B2a+B2b+B2c+B3b+B3c+B3d+B3f+B3g+B3h+B3i+B3j+B3k+B3l+B3m+B3n+B5a+B5b+B5c+B5d+B6a+B6b \leq 1$ (at least one dipole substitution on the B-site).

* * * * *